(12) United States Patent
Kalle

(10) Patent No.: US 8,826,444 B1
(45) Date of Patent: Sep. 2, 2014

(54) SYSTEMS AND METHODS FOR USING CLIENT REPUTATION DATA TO CLASSIFY WEB DOMAINS

(75) Inventor: Chandrasekhar Kalle, Santa Clara, CA (US)

(73) Assignee: Symantec Corporation, Mountain View, CA (US)

( * ) Notice: Subject to any disclaimer, the term of this patent is extended or adjusted under 35 U.S.C. 154(b) by 468 days.

(21) Appl. No.: 12/833,608

(22) Filed: Jul. 9, 2010

(51) Int. Cl.
*G06F 7/04* (2006.01)
*G06F 17/30* (2006.01)
*H04N 7/16* (2011.01)
*G06F 15/173* (2006.01)

(52) U.S. Cl.
USPC ................. 726/26; 726/22; 726/23; 709/223; 709/224

(58) Field of Classification Search
CPC . H04L 63/145; H04L 63/1433; H04L 63/102; H04L 63/1408; H04L 63/1425; H04L 63/1483; H04L 67/02
USPC ............................... 726/22–25; 709/223–226
See application file for complete search history.

(56) References Cited

U.S. PATENT DOCUMENTS

| | | | |
|---|---|---|---|
| 7,269,851 B2 | 9/2007 | Ackroyd | |
| 7,467,206 B2 * | 12/2008 | Moore et al. | 709/225 |
| 7,490,356 B2 * | 2/2009 | Lieblich et al. | 726/25 |
| 7,617,519 B2 * | 11/2009 | Williams | 726/1 |
| 7,761,565 B2 * | 7/2010 | Adelman et al. | 709/224 |
| 7,761,566 B2 * | 7/2010 | Adelman et al. | 709/224 |
| 7,822,631 B1 * | 10/2010 | Vander Mey et al. | 705/7.29 |
| 7,831,412 B1 | 11/2010 | Sobel | |
| 8,250,657 B1 * | 8/2012 | Nachenberg et al. | 726/25 |
| 8,621,638 B2 * | 12/2013 | Judge et al. | 726/25 |
| 8,635,690 B2 * | 1/2014 | Alperovitch et al. | 726/22 |
| 2004/0019807 A1 * | 1/2004 | Freund | 713/201 |
| 2005/0210285 A1 * | 9/2005 | Williams | 713/201 |
| 2005/0283831 A1 | 12/2005 | Ryu et al. | |
| 2006/0075494 A1 * | 4/2006 | Bertman et al. | 726/22 |
| 2006/0230452 A1 * | 10/2006 | Field | 726/22 |
| 2006/0253584 A1 | 11/2006 | Dixon et al. | |
| 2007/0107057 A1 * | 5/2007 | Chander et al. | 726/22 |
| 2007/0174911 A1 * | 7/2007 | Kronenberg et al. | 726/22 |
| 2009/0064330 A1 * | 3/2009 | Shraim et al. | 726/22 |
| 2009/0240769 A1 * | 9/2009 | Schran | 709/203 |
| 2009/0282476 A1 * | 11/2009 | Nachenberg et al. | 726/22 |
| 2010/0031358 A1 * | 2/2010 | Elovici et al. | 726/24 |
| 2010/0313248 A1 * | 12/2010 | Krivosheev et al. | 726/5 |
| 2011/0083180 A1 * | 4/2011 | Mashevsky et al. | 726/23 |
| 2011/0185423 A1 * | 7/2011 | Sallam | 726/23 |

OTHER PUBLICATIONS

Satish, Sourabh; U.S. Appl. No. 12/049,751, filed Mar. 17, 2008.
Satish, Sourabh; U.S. Appl. No. 12/056,379, filed Mar. 27, 2008.
Nachenberg, Carey S.; U.S. Appl. No. 12/415,834, filed Mar. 31, 2009.
Sourabh Satish et al.; Social Trust Based Security Model; Mar. 31, 2006; U.S. Appl. No. 11/394,846.

\* cited by examiner

*Primary Examiner* — Tae Kim
(74) *Attorney, Agent, or Firm* — ALG Intellectual Property, LLC

(57) ABSTRACT

A computer-implemented method for using client reputation data to classify web domains may include identifying a web domain. The computer-implemented method may also include identifying at least one client that has attempted to access the web domain. The computer-implemented method may further include identifying a reputation associated with the client that attempted to access the web domain. The computer-implemented method may additionally include classifying the web domain based at least in part on the reputation of the client that attempted to access the web domain. Various other methods, systems, and computer-readable media are also disclosed.

18 Claims, 23 Drawing Sheets

SYSTEMS AND METHODS FOR USING CLIENT REPUTATION DATA TO CLASSIFY WEB DOMAINS

BACKGROUND

With the rise of the Internet, users have come to access web sites on a daily basis for both personal and business use. As part of a web browsing experience, users may download and install portable executables (PEs) from web sites. Unfortunately, while users may generally trust that web sites and/or the PEs that they download from the same are not malicious and will not harm their computers or data, not all web domains are safe.

Malicious web domains may harm users, their data, or their computers in a variety of ways. For example, a web domain may host software (e.g., a malicious JAVA script) that immediately runs when a user accesses the web site. The malicious software or script may then infect or damage the user's computer. Similarly, a user may download a PE from a web domain that infects or harms the user's computer when the user installs the PE. Web domains may also host software that, when installed, resides on a user's machine and silently monitors the user's activity without authorization, In view of the above, it may be desirable for users to ascertain the maliciousness of a web domain before attempting to access that web domain. For example, a user that has previously been the victim of malicious software located at a malicious domain may later remember that the domain is malicious. The user may, therefore, refuse to access that domain again in the future. The user may also learn from one or more other users, who may themselves have been the victims of a malicious web domain, that a particular web domain has a reputation for being malicious. Such manual methods are, however, inefficient and/or generally unreliable. As such, the instant disclosure identifies a need for improved systems and methods for classifying web domains.

SUMMARY

As will be described in greater detail below, the instant disclosure generally relates to systems and methods for using client reputation data to classify web domains. In one example, the systems described herein may accomplish such a task by 1) identifying a web domain, 2) identifying at least one client (such as a device, user, or application) that has attempted to access the web domain, 3) determining or identifying the reputation of at least one client that has attempted to access the web domain, and then 4) classifying the web domain based at least in part on the reputation of at least one client that has attempted to access the web domain.

In one example, the systems described herein may identify at least one client that has attempted to access the web domain by receiving information from at least one client that indicates that an attempt by the client to access the web domain triggered a security event. In some examples, the security event may represent the activation of a signature within an intrusion prevention system, as discussed in greater detail below. In some cases, the information received from the client may identify the client and/or the web domain accessed by the client. For example, upon the triggering of a security event, a client may transmit its identity, as well as the identity of a web domain that triggered the security event, to a centralized server.

In one example, the systems described herein may classify the web domain in part by identifying a threat category triggered by the client's attempt to access the web domain. The threat category may include malicious PE files, malicious PDF files, malicious FLASH files, and/or any other category or subset of threats that a malicious web domain may pose to a user. In this example, the systems described herein may classify the web domain based at least in part on the threat category triggered by the client's attempt to access the web domain. For example, the systems disclosed herein may limit the analysis for classifying the web domain to information relevant to a particular threat category (e.g., limited to information about malicious FLASH files).

In one embodiment, the systems described herein may, when classifying the web domain, ignore at least some reputation information collected outside of a predetermined time window. For example, the systems disclosed herein may collect information relevant to a web domain on a perpetual basis. In this example, the systems described herein may have accumulated information from the previous 90 days. In this case, the disclosed systems may then ignore at least some of the information collected within those 90 days. For example, the systems described herein may ignore the first 60 days of information and only use information collected within the last 30 days. The particular timeframes discussed above are merely illustrative, however, and the systems disclosed herein may ignore at least some reputation information collected outside of any determined time window.

In one example, the systems described herein may classify the web domain in part by calculating a reputation score for the web domain based at least in part on the reputation of at least one client that has attempted to access the web domain. For example, if multiple clients that have attempted to access the web domain have a low reputation or a reputation for maliciousness, the systems disclosed herein may infer that the web domain is (e.g., proportionally or to that extent) more likely to be malicious.

In some examples, the systems described herein may also classify the web domain by determining that the reputation score for the web domain achieves a maliciousness threshold. A maliciousness threshold may be a particular value or hypothetical score that distinguishes malicious from non-malicious web domains, or distinguishes web domains that are suspected to be malicious from web domains that are not suspected to be malicious. In one example, if the systems described herein determine that a reputation score for the web domain achieves a maliciousness threshold, then these systems may perform a security operation on the web domain. For example, upon determining that a web domain achieves a particular maliciousness threshold, the web domain may be added to a blacklist, access to the web domain may be blocked, and/or downloading and installation of PEs from the web domain may be blocked.

Upon calculating the reputation score, the systems disclosed herein may also identify a reputation associated with at least one additional client that attempted to access the web domain. Accordingly, the systems described herein may accumulate reputation information for a multitude of clients. These systems may also update the reputation score for the web domain based at least in part on the reputation of the additional client. Accordingly, the reputation score for the web domain may reflect the reputations of a plurality of clients. For example, if a large number of clients with low reputations or reputations for maliciousness are accessing the web domain, then the web domain may be considered to be more likely to be malicious.

In some embodiments, the systems disclosed herein may also determine that the updated reputation score does not achieve the maliciousness threshold. Thus, a web domain that was previously classified as malicious may later, upon updating the reputation score, be classified as non-malicious based on the reputation of the additional client. That is, the inclusion of the reputation of the additional client into the classification of the web domain may result in a lowering of the web domain's reputation score below the maliciousness threshold.

In one example, the systems described herein may classify the web domain based at least in part on at least one of a third-party classification of the web domain and a previous classification of the web domain. The third-party classification of the web domain may be a previously identified classification of the web domain made by a third party independently of exemplary systems and methods disclosed herein. For example, the disclosed systems may access a third party web domain classification database to retrieve classifications of web domains that are generated by methods alternative, supplemental, or partially redundant to those disclosed herein. The exemplary systems described herein may then use the independent third-party classification as an initial reputation score to feed into the classification algorithm. Additionally, or alternatively, the systems described herein may classify the web domain based on a previous classification of the web domain that was generated by a previous execution or activation of exemplary systems and methods disclosed herein.

In certain embodiments, a system for web domain classification may include 1) a web domain identification module programmed to identify a web domain, 2) a client identification module programmed to identify at least one client that has attempted to access the web domain, 3) a client reputation identification module programmed to identify a reputation associated with the client that attempted to access the web domain, and 4) a web domain classification module programmed to classify the web domain based at least in part on the reputation of the client that attempted to access the web domain.

As will be explained in greater detail below, by classifying web domains based on reputation information for one or more clients, the systems and methods disclosed herein may improve the accuracy of such a classification. In particular, the systems and methods described herein may more accurately determine whether a particular web domain is malicious (or the degree to which it is malicious) based on reputation information for one or more clients.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
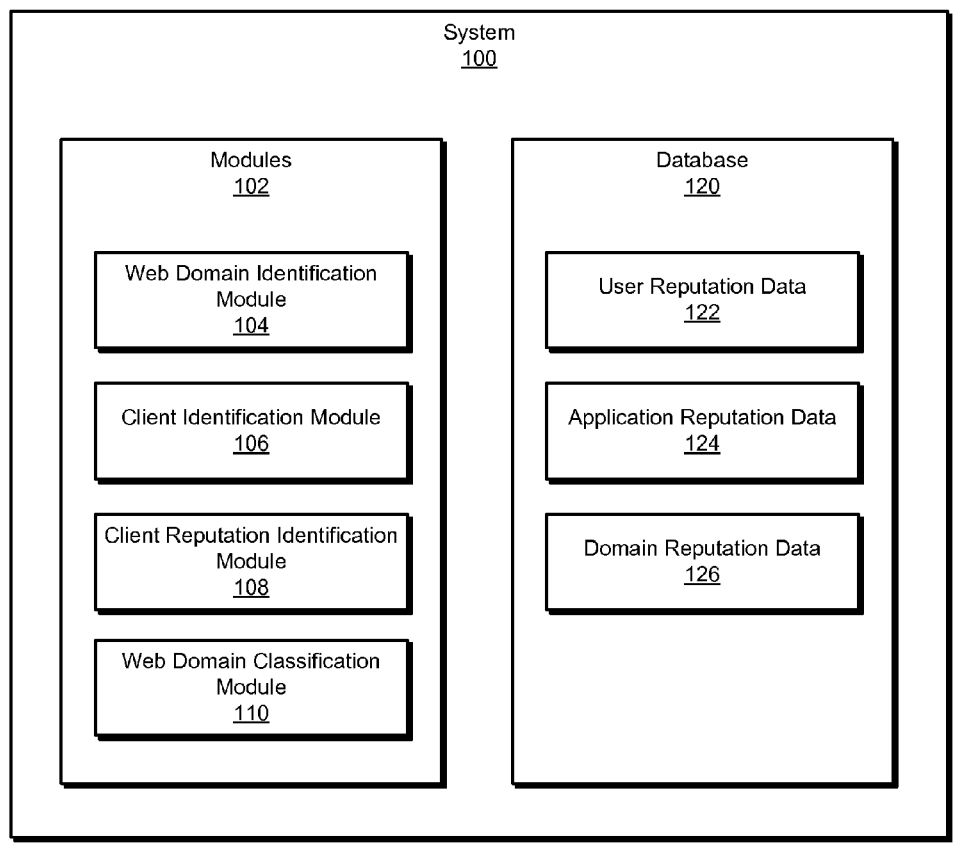
FIG. 1 is a block diagram of an exemplary system for using client reputation data to classify web domains.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The instant disclosure generally relates to systems and methods for using client reputation data to classify web domains. The following will provide, with reference to FIGS. 1-2, detailed descriptions of exemplary systems for using client reputation data to classify web domains. Detailed descriptions of corresponding computer-implemented methods will also be provided in connection with FIGS. 3-21. In addition, detailed descriptions of an exemplary computing system and network architecture capable of implementing one or more of the embodiments described herein will be provided in connection with FIGS. 22 and 23, respectively.

FIG. 1 is a block diagram of an exemplary system 100 for using client reputation data to classify web domains. As illustrated in this figure, exemplary system 100 may include one or more modules 102 for performing one or more tasks. For example, and as will be explained in greater detail below, exemplary system 100 may include a web domain identification module 104 programmed to identify a web domain. Exemplary system 100 may also include a client identification module 106 programmed to identify at least one client that has attempted to access the web domain.

Exemplary system 100 may also include a client reputation identification module 108 programmed to identify the reputation of at least one client that has attempted to access the web domain. Exemplary system 100 may also include a web domain classification module 110 programmed to classify the web domain based at least in part on the reputation of at least one client that has attempted to access the web domain. Although illustrated as separate elements, one or more of modules FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing devices 202(1)-(N) and/or server 206), computing system 2210 in FIG. 22, and/or portions of exemplary network architecture 2300 in FIG. 23. One or more of modules 102 in FIG. 1 may also represent all or portions of one or more special-purpose computers configured to perform one or more tasks.

As illustrated in FIG. 1, exemplary system 100 may also include a database 120. Database 120 may represent portions of a single database or computing device or a plurality of databases or computing devices. In one embodiment, and as will be explained in greater detail below, database 120 may include user reputation data 122, application reputation data 124, and/or domain reputation data 126.

Database 120 in FIG. 1 may represent a portion of one or more computing devices. For example, database 120 may represent a portion of server 206 in FIG. 2, computing system 2210 in FIG. 22, and/or portions of exemplary network architecture 2300 in FIG. 23. Alternatively, database 120 in FIG. 1 may represent one or more physically separate devices capable of being accessed by a computing device, such as server 206 in FIG. 2, computing system 2210 in FIG. 22, and/or portions of exemplary network architecture 2300 in FIG. 23.

Figure 2:
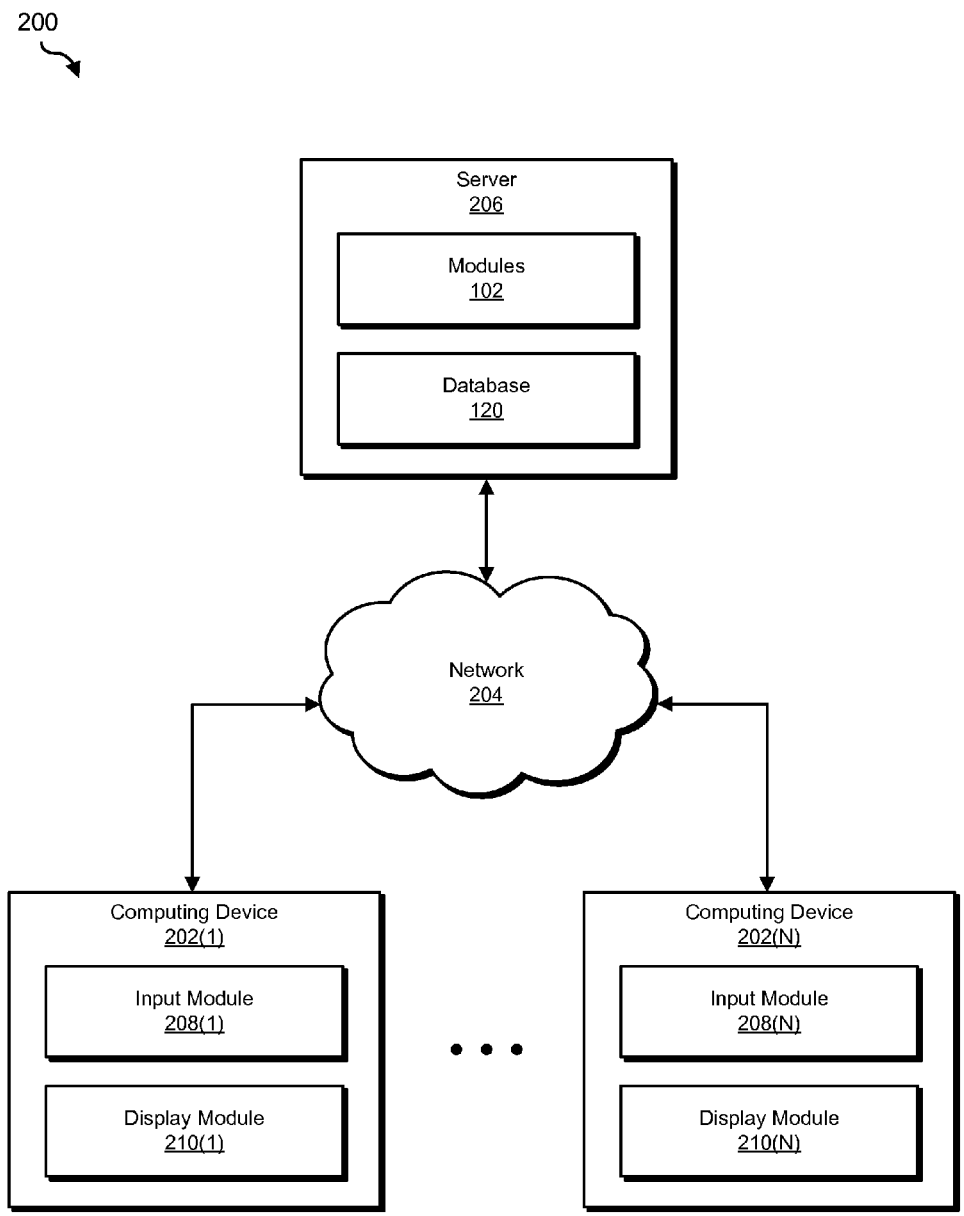
FIG. 2 is a block diagram of an exemplary system for using client reputation data to classify web domains.

Exemplary system 100 in FIG. 1 may be deployed in a variety of ways. For example, all or a portion of exemplary system 100 may represent portions of an exemplary system 200 in FIG. 2. As shown in FIG. 2, system 200 may include a plurality of computing devices 202(1)-(N) in communication with a server 206 via a network 204. In one example, and as will be described in greater detail below, modules 102 may program server 206 to 1) identify a web domain, 2) identify at least one client (e.g., a computing device, user, and/or application) that has attempted to access the web domain in question, 3) determine or identify the reputation of at least one client that has attempted to access the web domain, and 4) classify the web domain based at least in part on the reputation of at least one client that has attempted to access the web domain.

Computing devices 202(1)-(N) generally represent any type or form of computing device capable of reading computer-executable instructions. Examples of computing devices 202(1)-(N) include, without limitation, laptops, desktops, servers, cellular phones, personal digital assistants (PDAs), multimedia players, embedded systems, combinations of one or more of the same, exemplary computing system 2210 in FIG. 22, or any other suitable computing device.

Server 206 generally represents any type or form of computing device which, in combination with computing devices 202(1)-(N), may perform the methods disclosed in this application. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 2300 in FIG. 23, or the like. Network 204 may facilitate communication or data transfer using wireless or wired connections. In one embodiment, network 204 may facilitate communication between computing devices 202(1)-(N) and server 206.

Although depicted as residing in server 206, several modules shown in FIG. 2 may alternatively reside in computing devices 202(1)-(N). For example, one or more of data 122-126 and modules 104-110 may alternatively reside in computing devices 202(1)-(N).

Figure 3:
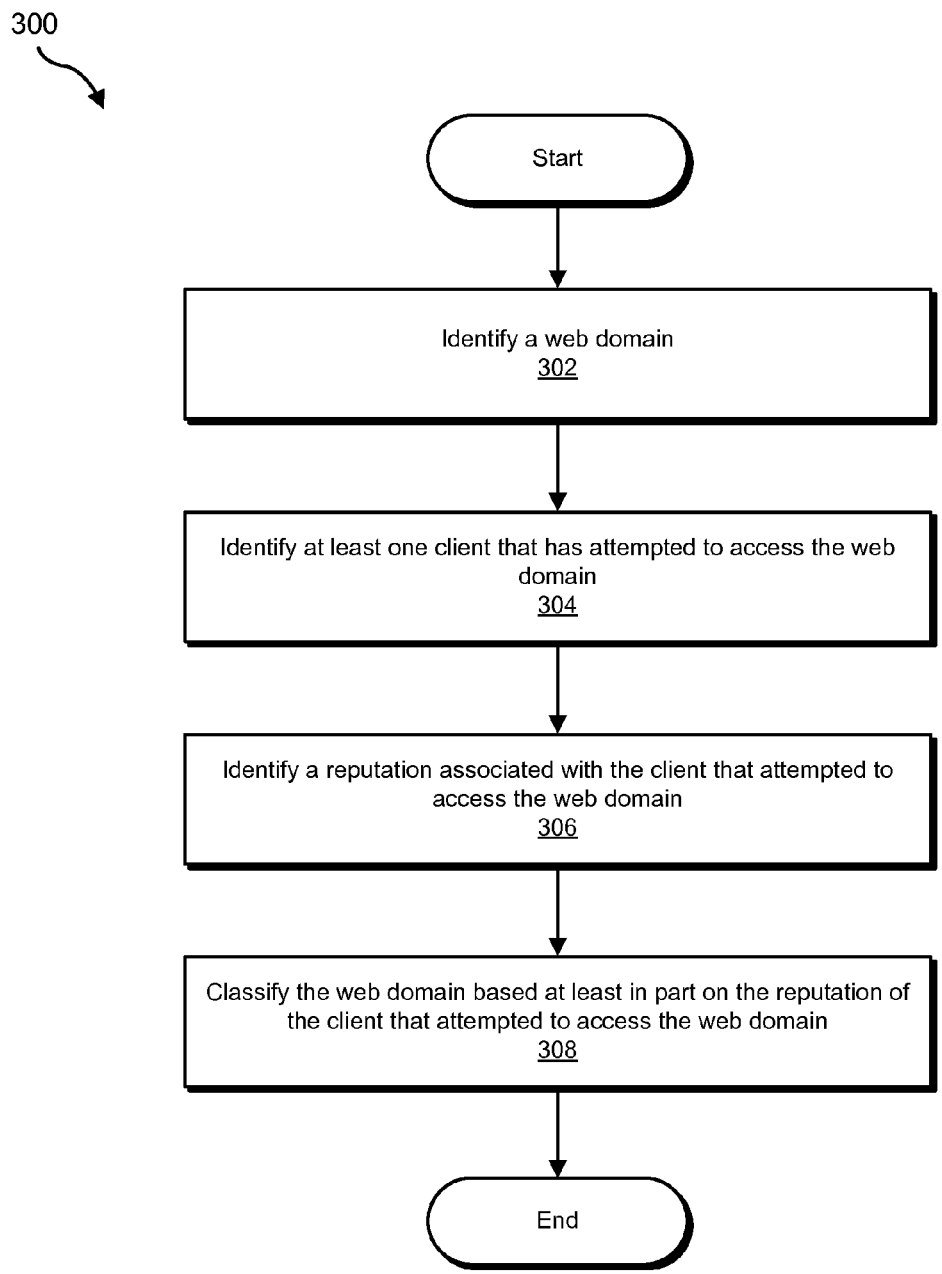
FIG. 3 is a flow diagram of an exemplary method for using client reputation data to classify web domains.

FIG. 3 is a flow diagram of an exemplary computer-implemented method 300 for using client reputation data to classify web domains. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

As illustrated in FIG. 3, at step 302 one or more of the systems described herein may identify a web domain. For example, web domain identification module 104 may, as part of server 206 in FIG. 2, identify a web domain that triggered a security event at one or more of computing devices 202(1)-(N), as explained in greater detail below.

The systems described herein may perform step 302 in a variety of ways. In one example, web domain identification module 104 may perform step 302 by identifying a web domain that is to be monitored. For example, web domain identification module 104 may, upon analyzing various attributes, characteristics, and/or behaviors of a particular web domain (as part of server 206 in FIG. 2), label the same as "suspicious" and determine to monitor the same. The term "web domain," as used herein, may refer to an IP address, a general domain (e.g., www.example.com), and/or a specific URL (e.g., http://www.example.com/index.html) or other network (e.g., Internet) location.

In another example, web domain identification module 104 may perform step 302 by identifying a web domain that triggered a security event at a computing device, such as computing devices 202(1)-(N) in FIG. 2. For example, server 206 may receive, from one or more of computing devices 202(1)-(N), an identification of a web domain that triggered a security event on the computing device in question. As will be explained in greater detail below, a "security event," as used herein, may refer to an event that, if left alone, may compromise the state of security of a user's computing device and/or data. Examples of such security events include, without limitation, attempts by software or files originating from a web domain (or elsewhere) to infiltrate, modify, harm, or otherwise access a user's computer or data without authorization. In some examples, computer-security software, such as intrusion prevention systems, may detect such events through, e.g., the use of various signatures and/or heuristics, as explained in greater detail below.

Returning to FIG. 3, at step 304 one or more of the systems described herein may identify at least one client that has attempted to access the web domain identified in step 302. For example, client identification module 106 may, as part of server 206 in FIG. 2, receive (from, e.g., one or more of computing devices 202(1)-(N)) an identification of a user, device, and/or application that has attempted to access the web domain identified in step 302.

Figure 4:
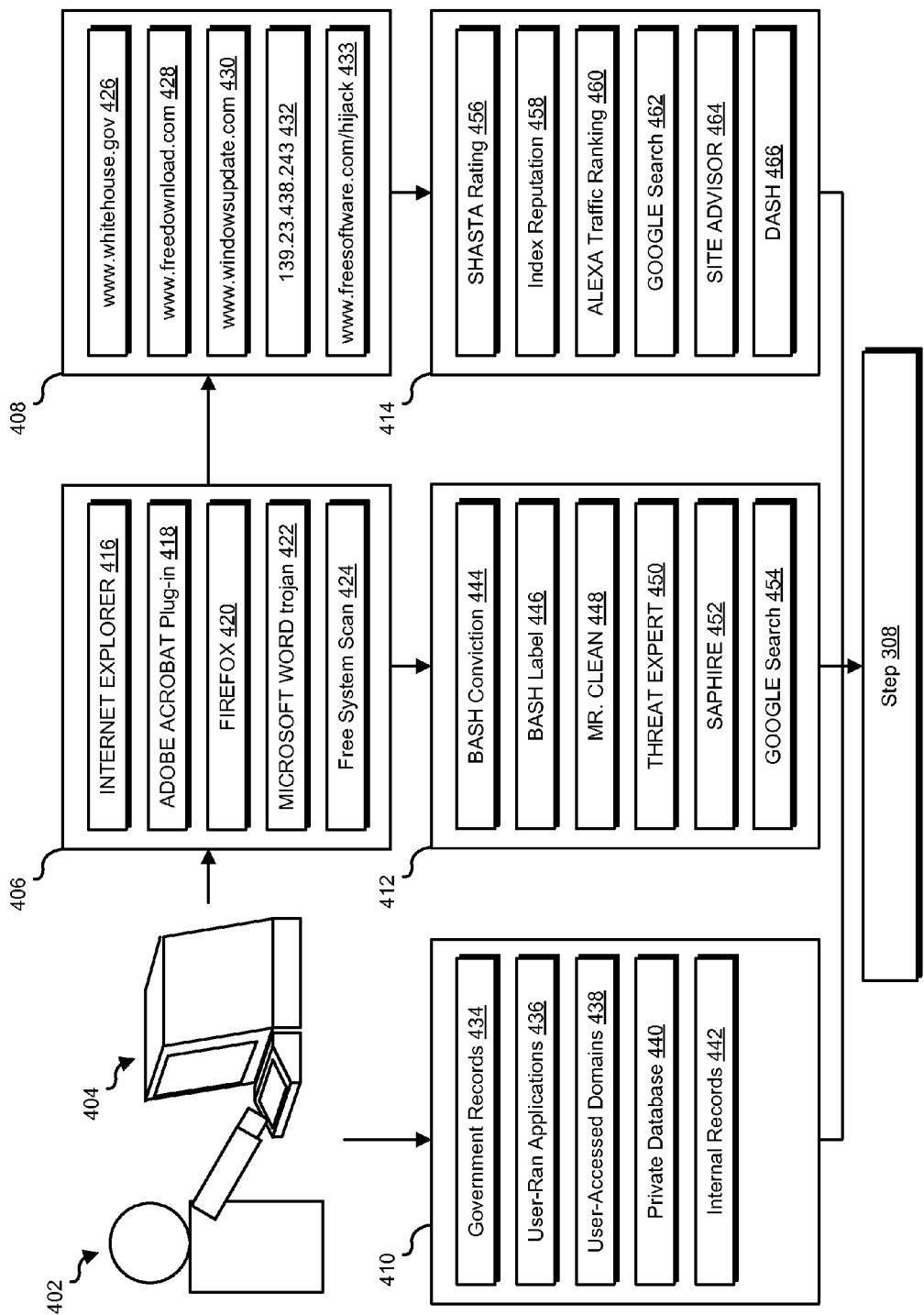
FIG. 4 illustrates exemplary web domains that clients may attempt to access.

The term "client," as used herein, may refer to, without limitation, a computing device, a user of the same, and/or an application or process running on the same. FIG. 4 is an illustration of a variety of exemplary clients and web domains that such clients may attempt to access. In this example, a user 402 operating a computing device 404 may use computing device 404 to operate or execute a variety of applications 406. Computing device 404 may be an example of computing devices 202(1)-(N) shown in FIG. 2.

Examples of applications that user 402 may cause computing device 404 to execute include, without limitation, INTERNET EXPLORER 416, ADOBE ACROBAT plug-in 418, FIREFOX 420, MICROSOFT WORD trojan 422, and/or free system scan 424. INTERNET EXPLORER 416 and FIREFOX 420 are popular examples of browser software for accessing web sites on the Internet. ADOBE ACROBAT Plug-In 418 may be a plug-in software module added onto the popular ADOBE ACROBAT document reading software. MICROSOFT WORD trojan 422 may be a trojan or other malicious software, such as a malicious script, surreptitiously operating within MICROSOFT WORD's process space. Free system scan 424 may be a free software utility offered on the Internet that alleges to scan and clean the user's computer for malicious software.

User 402 may use any combination of applications 416-424 on computing device 404. In some examples, user 402 may intentionally attempt to access a web domain using the particular application. For example, user 402 may use INTERNET EXPLORER 416 and/or FIREFOX 418 to intentionally access web sites, such as www.whitehouse.gov 426 and www.windowsupdate.com 430. Additionally, or alternatively, one or more of the applications shown in FIG. 4 may attempt to access web domains without authorization by user 402. For example, MICROSOFT WORD trojan 422 may attempt to access a malicious web domain, such as www.freesoftware.com/hijack 433, without user 402's authorization or awareness. In particular, although user 402 may only intend to edit a local MICROSOFT WORD document at computing device 404, MICROSOFT WORD trojan 422 may, while operating within MICROSOFT WORD's process space, attempt to surreptitiously access a malicious web domain, such as www.freesoftware.com/hijack 433.

The systems described herein may perform step 304 in a variety of ways. In one example, identification module 106 may receive (as part of, e.g., server 206 in FIG. 2) an identification of a client (e.g., a device, user, and/or application) that attempted to access a monitored web domain. For example, web domain identification module 104, client identification module 106, and/or another module may, as part of computing devices 202(1)-(N) in FIG. 2 (e.g., as part of security software installed on computing devices 202(1)-(N)), notify server 206 when computing devices 202(1)-(N) (or a user of the same and/or an application installed on the same) attempt to access a suspicious or untrusted web domain (such as an untrusted web domain) currently monitored by server 206 and/or security software on computing devices 202(1)-(N).

As detailed above, an attempt by a client to access a particular web domain may trigger a security event in a variety of ways. For example, an attempt by computing device 404 (or an application installed on the same) to access domain 433 in FIG. 4 ("www.freesoftware.com/hijack") may trigger activation of a signature or heuristic within an intrusion prevention system installed on computing device 404 (resulting in the detection of a security event) if computing device 404 downloads known-malicious software from domain 433 (e.g., if the hash of an application or file downloaded from domain 433 matches the hash of a known-malicious application or file), if computing device 404 downloads an application whose attributes, characteristics, and/or behaviors trigger a malware-detection heuristic maintained by the intrusion prevention system, if domain 433 is included within a web domain blacklist or excluded from a web domain whitelist (maintained, e.g., by a centralized computing device, such as server 206 in FIG. 2), or the like.

In some examples, web domain identification module 104 and/or client identification module 106 may transmit an identification of a web domain and/or client upon identification of the same in steps 302 and/or 304 (e.g., upon determining that a client is attempting to access a web domain that is determined to be malicious or otherwise suspect). For example, an intrusion prevention system installed on computing device 404 may transmit an identification of an application, user, or computing device and/or a web domain accessed by the same to a centralized computing device, such as server 206 in FIG. 2, as part of steps 302 and/or 304.

In some examples, this identification information may include information that may help distinguish or uniquely the user, computing device, application, and/or web domain in question from all other users, devices, applications, and/or web domains, respectively. In some examples, this identification information may be based on hash values or other hardware/software fingerprinting methods to uniquely or partially identify users, computing devices, applications, and/or web domains. In some embodiments, these identifications may be non-unique or merely partial in form.

Figure 6:
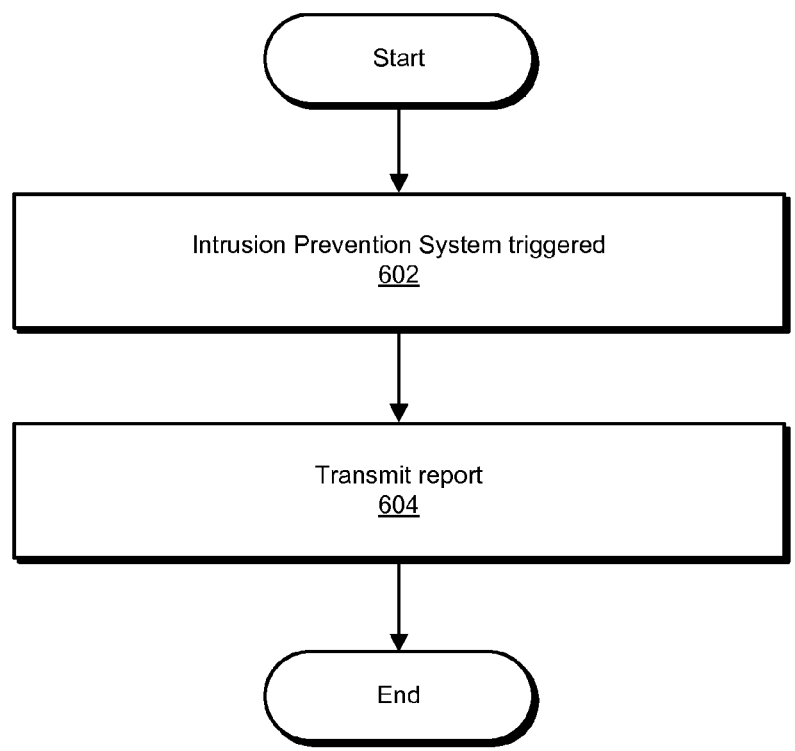
FIG. 6 is a flow diagram of an exemplary method for using client reputation data to classify web domains.

An example of the client-side process involved in step 304 is illustrated in FIG. 6. As illustrated in this figure, at step 602 an intrusion prevention system operating on a client device (e.g., computing devices 202(1)-(N)) may be triggered. The intrusion prevention system may be triggered by a security event, as discussed above. For example, web domain identification module 104 may determine that a client is attempting to access a web domain that is known to be malicious or otherwise suspect. The intrusion prevention system may be triggered whenever the criteria of one or more intrusion prevention signatures are satisfied, as discussed above.

At step 604, web domain identification module 104 and/or one or more other modules of system 100 (e.g., client identification module 106) may transmit a report from the client (e.g., computing devices 202(1)-(N) in FIG. 2) to a centralized server (e.g., server 206 in FIG. 2) based on the security event triggered at step 602. As explained above, this report may identify the web domain that the client attempted to access, the client that attempted to access the web domain, a reputation associated with the web domain and/or the client, and/or any other relevant information. Upon completion of step 604, exemplary method 600 in FIG. 6 may terminate.

Returning to FIG. 3, at step 306 one or more of the systems described herein may identify a reputation associated with the client identified in step 304. For example, client reputation identification module 108 may, as part of server 206 in FIG. 2, calculate or merely identify a reputation score for at least one client that has attempted to access the web domain identified in step 302.

The systems described herein may perform step 306 in a variety of ways. In one example, client reputation identification module 108 may ascertain a reputation of a client (such as user 402, computing device 404, and/or one or more of applications 406 in FIG. 4) that has attempted to access the web domain identified in step 302 from any of a variety of reputation sources, such as client reputation sources 410, application reputation sources 412, and/or domain reputation sources 414 in FIG. 4.

The term "client reputation service," as used herein, may refer to any service and/or source of reputation information for clients. As illustrated in FIG. 4, examples of client reputation sources 410 may include, without limitation, government records 434, information that identifies user-ran applications 436, information that identifies user-accessed domains 438, private database 440, and/or internal records 442. Government records 434 may represent a database of records indicating whether users, such as user 402, or hardware, such as computing device 404, are known or suspected to be malicious or non-malicious, according to the government. Government records 434 may also indicate any other information about the reputations of users and/or computing devices.

User-ran applications 436 may identify applications that user 402 is known to execute or operate on computing device 404 (or elsewhere) and/or identify applications that are known to execute or operate on computing device 404 (based on the instructions of user 402 or other users). In this example, system 100 may ascertain reputations associated with these applications to determine a reputation of a user and/or computing device in question. For example, to the extent that user 402 or computing device 404 is known to execute or operate applications with low reputations or reputations for maliciousness, user 402 and/or computing device 404 may be identified as having a low reputation. The reputations of user-ran applications 436 may also be identified based on application reputation sources 412, as shown in FIG. 4 and discussed more below.

User-accessed domains 438 may indicate web domains that user 402 and/or computing device 404 has attempted to access. In this example, client reputation identification module 108 may identify reputations associated with these web domains. For example, to the extent that user 402 and/or computing device 404 is known to attempt to access web domains having a low reputation or a reputation for maliciousness, user 402 and/or computing device 404 may be considered to have a low reputation. The reputations of user-accessed domains 438 may also be determined based on web domain reputation sources 414, as shown in FIG. 4 and discussed more below.

Private database 440 may be an independent, third-party database that indicates reputations associated with users, such as user 402, and computer devices, such as computing device 404. Unlike government records 434, private database 440 may be created and/or maintained by a private entity. The reputations indicated in private database 440 may be calculated, generated, or otherwise determined according to methods that are independent, supplemental, and/or partially redundant to the various exemplary systems and methods described herein.

Internal records 442 may indicate a reputation of user 402 and/or computing device 404, as previously determined by client reputation identification module 108. The reputation data stored in internal records 442 may be calculated based on any of the other client reputation sources 434-440, as shown in FIG. 4 and discussed above. Internal records 442 may be stored at computing device 404 as an example of computing devices 202(1)-(N) and/or stored at server 206. Client reputation identification module 108 may store previously identified client reputations in internal records 442. Client reputation identification module 108 may then update previously identified reputations stored in internal records 442 based on any additional reputation information later received.

As detailed above, in some examples client reputation identification module 108 may identify or determine a reputation to be associated with a client based at least in part on application reputation information retrieved from an application reputation service. The term "application reputation service," as used herein, may refer to any service and/or source of reputation information for applications. As illustrated in FIG. 4, examples of application reputation sources 412 may include, without limitation, BASH convictions (e.g., BASH conviction 444), BASH labels (e.g., BASH Label 446), MR. CLEAN scores (e.g., MR. CLEAN 448), THREAT EXPERT ratings (e.g., THREAT EXPERT 450), SAPHIRE ratings (e.g., SAPHIRE 452), and/or various web searches (e.g., GOOGLE search 454).

The BASH (short for "Behavioral Analysis and Signature Heuristics") system may represent a system developed by SYMANTEC CORP. that analyzes the behavior of an application to determine whether an application is malicious or otherwise suspect. In some examples, BASH conviction 444 may indicate the existence and/or type of a conviction by the BASH system that an application is malicious. Similarly, BASH label 446 may include a label assigned to an application by the BASH system based on an analysis of the application's attributes, characteristics, and/or behavior. In addition, MR. CLEAN 448, THREAT EXPERT 450, SAPHIRE 452, and GOOGLE Search 454 may identify or indicate maliciousness levels and/or other reputation information about applications as identified by independent, third-party software programs or organizations (e.g., GOOGLE).

In some examples, and as detailed above, client reputation identification module 108 may identify or determine the reputation of a client based at least in part on reputation information associated with one or more web domains accessed by the client. In these examples, client reputation identification module 108 may determine the reputation of a web domain by retrieving the same from a domain reputation service. The term "domain reputation service," as used herein, may refer to any service and/or source of reputation information for web domains. As illustrated in FIG. 4, examples of domain reputation sources 414 may include, without limitation, SHASTA ratings (SHASTA rating 456), indexed reputations (index reputation 458), ALEXA traffic rankings (ALEXA traffic ranking 460), web searches (e.g., GOOGLE search 462), SITE ADVISOR ratings (e.g., SITE ADVISOR 464), and DASH ratings (e.g., DASH 466). Each of domain reputation sources 456-464 may represent an independent, third-party source of reputations that are calculated using methods that are independent, supplemental, and/or partially redundant to the exemplary methods described herein. In addition, the DASH system (short for "Domain Analysis and Signature Heuristics") may refer to an exemplary embodiment of one or more of the systems and methods described herein. User-accessed domains 438 within client reputation sources 410 may indicate the reputations of domains as calculated by the DASH system and/or by web domain classification module 110, as discussed more below.

Returning to FIG. 3, at step 308 one or more of the systems described herein may classify the web domain based at least in part on the reputations of clients that have attempted to access the web domain. For example, web domain classification module 110 may, as part of server 206 in FIG. 2, classify one or more of web domains 408 in FIG. 4 as malicious and/or non-malicious based at least in part on the client reputation information identified in step 306.

The systems described herein may perform step 308 in a variety of ways. In one example, the systems described herein may classify a web domain based at least in part on the reputations of multiple (e.g., hundreds or more) clients that have attempted to access the web domain. For example, if client reputation identification module 108 determines that a plurality or a majority of the clients that have accessed a particular web domain have low reputations, then web domain classification module 110 may determine that the web domain in question is likely malicious. In contrast, if client reputation identification module 108 determines that a plurality or a majority of the clients that have accessed the web domain have good reputations, then web domain classification module 110 may determine that the web domain in question is less likely to be malicious.

In one example, web domain classification module 110 may classify the web domain identified in step 302 by calculating a reputation score for the same based at least in part on reputation scores associated with clients (e.g., users, computing devices, and/or applications) that have attempted to access the web domain. For example, and as will be described in greater detail below in connection with FIG. 7, web domain classification module 110 may calculate a reputation score for a web domain using a weighting system that assigns weights to each of a variety of calculations based on client reputations. Web domain classification module 110 may then take a sum or multiple (or other aggregate) of the weights to calculate a reputation score for the web domain in question.

In some examples, a web domain's reputation score may generally correlate with the reputation scores of clients that have attempted to access the web domain. For example, if client identification module 106 determines in step 308 that a plurality or a majority of the clients that have attempted to access domain 433 have low reputations, then web domain classification module 110 may assign a proportionally low reputation score to domain 433.

However, because a web domain's reputation score may be based on a variety of factors and a variety of client reputations, no single client reputation may be decisive. For example, even if a computing device has a reputation for maliciousness, a web domain accessed by this computing device may still be classified as non-malicious based on other factors, such as the good reputation scores of other clients that have attempted to access the web domain. As described above, web domain classification module 110 may use a weighting system to add, multiply, or otherwise aggregate weights for factors based on a variety of client reputations. In this case, a negative weight associated with one particular client reputation (e.g., one of applications 406) may be overpowered by the good reputation scores of other clients (e.g., user 402 and/or computing device 404).

As explained in more detail below, FIGS. 7-17 show a wide variety of other methods 700-1700 that may be performed as part of step 308. Any number of these methods, in largely any order, may be performed at step 308 in part to classify a web domain based on client reputation data. Upon completion of step 308, exemplary method 300 in FIG. 3 may terminate.

Figure 5:
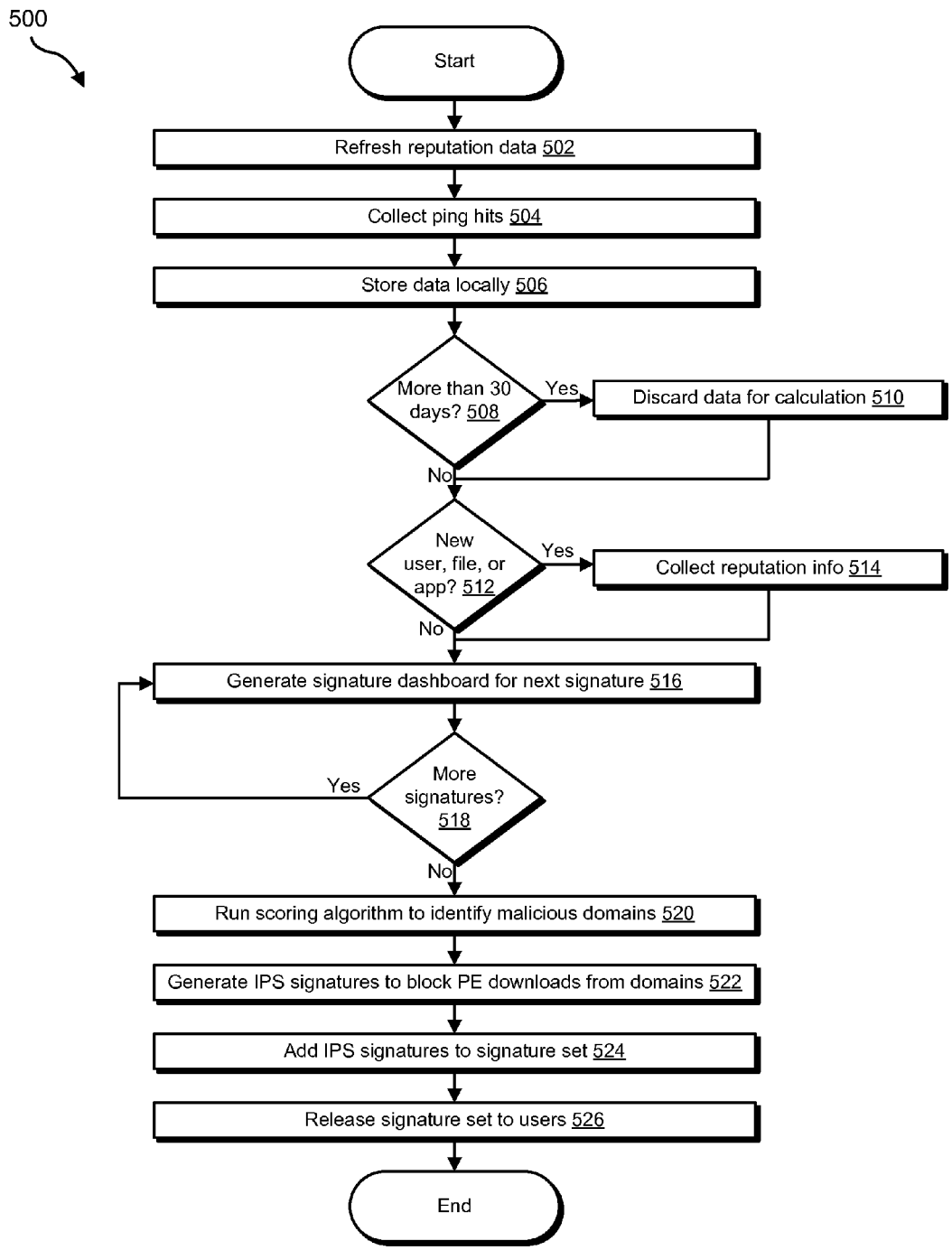
FIG. 5 is a flow diagram of an exemplary method for using client reputation data to classify web domains.

The above discussion of FIGS. 3 and 4 provides an overview of how the systems and methods described herein may use client reputation data to classify web domains. The following discussion of FIG. 5 provides a more detailed description of an exemplary embodiment for classifying web domains using client reputation data. The steps shown in FIG. 5 may be performed by any suitable computer-executable code and/or computing system. In some embodiments, the steps shown in FIG. 5 may be performed by one or more of the components of system 100 in FIG. 1 and/or system 200 in FIG. 2.

As illustrated in FIG. 5, at step 502 web domain classification module 110 may, prior to classifying a web domain or application, refresh reputation data for one or more applications and/or web domains in order to ensure the use of up-to-date information. For example, web domain classification module 110 may (as part of, e.g., server 206 in FIG. 2) consult any of the third-party or other databases included within application reputations sources 412 and domain reputation sources 414 to retrieve updated information. Web domain classification module 110 may also retrieve the most-recent information from internal records 442 and DASH 446.

At step 504, web domain identification module 104 may (as part of, e.g., server 206 in FIG. 2) collect ping hits from one or more client devices (e.g., computing devices 202(1)-(N)). The term "ping hits," as used herein, may refer to a record of web domains that a particular client has attempted to access. For example, a monitoring module on computing devices 202(1)-(N) may monitor the web domains that clients are attempting to access and report the same to server 206.

At step 506, web domain identification module 104, client identification module 106, and/or client reputation identification module 108 may (as part of, e.g., server 206 in FIG. 2) locally store the information identified or collected in steps 502 and 504. By storing this information locally, the burden on modules 104-108 may be lessened, so that these modules may consult sources, such as the third-party sources included within client reputation sources 410 and application reputation sources 412, less frequently.

From step 506, method 500 may proceed to decision block 508, where web domain identification module 104, client identification module 106, and/or client reputation identification module 108 may (as part of, e.g., server 206 in FIG. 2) determine whether their respective identification records (retrieved, for example, at steps 502 and 504) are more than 30 days old. The timeframe of 30 days is merely exemplary, and the instant disclosure contemplates systems and methods using any suitable timeframe, as discussed below. If the reputation data and ping hits are more than 30 days old, then method 500 may proceed to step 510, where data that is older than 30 days may be discarded so as not to be included within the later calculation of the domain reputation score (discussed in connection with steps 308 and/or 520 in FIGS. 3 and 5, respectively). If, however, the systems described herein determine that this data is less than 30 days old, then the data may considered to be sufficiently up-to-date and may be used for the calculation of the domain reputation score. By eliminating reputation data and ping hits data that are older than 30 days old, or any other suitable timeframe (the instant disclosure contemplates timeframes in a range from seconds to years), system 100 may ensure that a calculation of the domain reputation score is based on data that is recent and up-to-date.

From decision block 508, method 500 may proceed to decision block 512, where client reputation identification module 108 may (as part of, e.g., server 206 in FIG. 2) determine whether any of the users, files, or applications (or computing devices) attempting to access web domains (as reported, for example, at step 504) are new to client reputation identification module 108. If so, then client reputation identification module 108 may collect reputation information for the new client. As detailed above, client reputation identification module 108 may collect this reputation information from sources including client reputation sources 410 and application reputation sources 412. If, however, the systems described herein determine at decision block 512 that the client or clients in question are not new to client reputation identification module 108, then method 500 may proceed using previously collected or otherwise obtained reputation information for the users, files, and/or application (or computing devices) that are not new to client reputation identification module 108.

From decision block 512, method 500 may proceed to steps 516 through 518, where the systems described herein may generate a signature dashboard for each active intrusion prevention signature. The term "intrusion prevention signature," as used herein, may refer to a set of criteria for identifying (based on, e.g., various attributes, characteristics, and/or behaviors) and/or blocking security events, as discussed above. Examples of such intrusion prevention signatures include, without limitation, blocking signatures that trigger when an application makes an HTTP request for an image and receives a PE file in response, blocking signatures that, when triggered, block access to a web domain or block downloading of PEs, silent signatures that, when triggered, monitor a web domain or add a web domain to a blacklist without blocking the same, silent signatures that trigger when a non-browser application downloads a PE file from an IP address, silent signatures that trigger when a non-browser application downloads a PE file from a PHP script, blocking signatures that trigger when a PE file is downloaded from a known fakescan PE download URL pattern, silent signatures that trigger when a PE file is downloaded by known-malicious applications (e.g., XRun.exe, which is a known-malicious program), silent signatures that trigger when a PE file is downloaded by a system process (e.g., winlogon.exe, explorer.exe), silent signatures that trigger when a PE file is downloaded from particular domains (e.g., .pl, .cn, .br), silent signatures that trigger when a PE file is downloaded by certain suspicious applications (e.g., [a-z].exe, movie.exe, codec.exe, etc.), and/or silent signatures that trigger when a PE file is downloaded by particularly vulnerable applications (e.g., ADOBE applications, such as those including or referencing acrord32.exe, or MICROSOFT OFFICE applications, such as those including or referencing powerpnt.exe, winword.exe, excel.exe). Additionally, or alternatively, one or more of the above signatures may be blocking instead of silent (or vice-versa). In some examples, the signature dashboard generated may represent an intermediate report, reporting all of the ping hits from the ping hits collected at step 504 that triggered the signature in question.

Upon generating a signature dashboard for each active intrusion prevention signature, method 500 may proceed to step 520, where web domain classification module 110 may (as part of, e.g., server 206 in FIG. 2) execute a scoring algorithm to identify malicious domains. Web domain classification module 110 may classify web domains as discussed above and/or in accordance with any of the detailed formulas discussed below in connection with FIGS. 7-21.

From step 520, method 500 may proceed to step 522, where web domain classification module 110 may generate intrusion prevention system signatures to block portable executable downloads from the web domains that are identified as malicious at step 520. From step 522, method 500 may proceed to step 524, where web domain classification module 110 may add the intrusion prevention system signatures generated at step 522 to a signature set. Lastly, at step 526 web domain classification module 110 may release the signature set compiled at step 524 to users. For example, server 206 in FIG. 2 may transmit the signature set to computing devices 202(1)-(N) connected to server 206 via network 204. Upon completion of step 526, method 500 may terminate.

Figure 7:
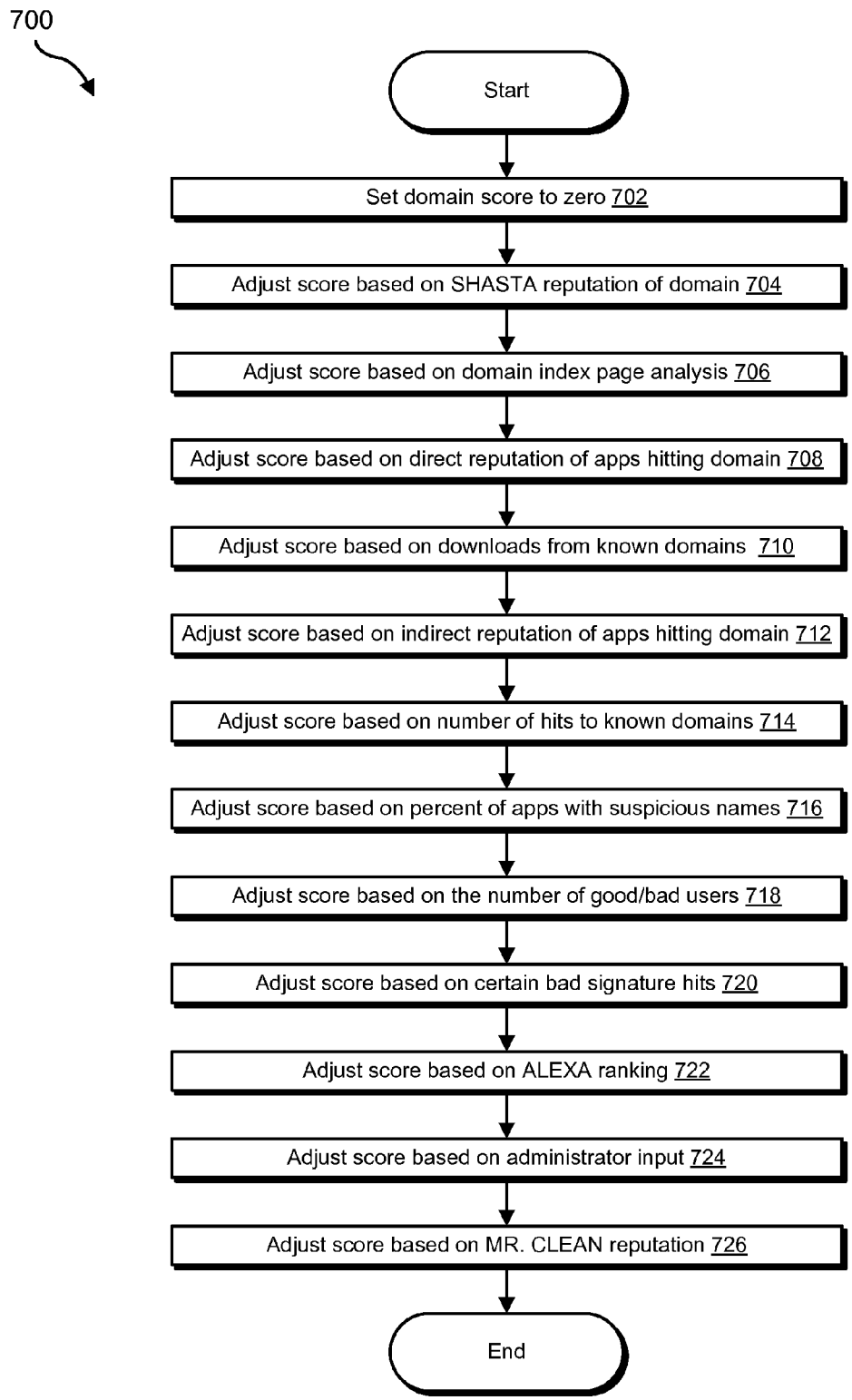
FIG. 7 is a flow diagram of an exemplary method for using client reputation data to classify web domains.

FIG. 7 is a flow diagram illustrating an exemplary computer-implemented method 700 for calculating reputation scores for web domains. The steps shown in FIG. 7 may be performed by any suitable computer-executable code and/or computing system. In some embodiments, the steps shown in FIG. 7 may be performed by one or more of the components of system 100 in FIG. 1 and/or system 200 in FIG. 2. For example, web domain classification module 110, and/or one or more other modules within system 100, may perform any of the steps in method 700.

Notably, exemplary systems and methods described herein are not limited to methods that include each of the steps shown in FIG. 7, or to the particular order of those steps as shown in FIG. 7. Rather, the calculation of the domain reputation score may include any subset of the steps shown in FIG. 7. Further, the order of the steps in FIG. 7 is largely interchangeable.

As illustrated in FIG. 7, at step 702 one or more of the systems described herein may initially set a web domain's reputation score to zero. For example, web domain classification module 110 may set a particular domain's reputation score to an initial baseline value of zero.

The use of the value zero is merely exemplary. In this example, the value zero serves as a baseline value, from which further additions or subtractions (or other adjustments) may be made. The systems and methods disclosed herein are not, however, limited to the use of the value zero as a baseline value, or even to the use of numbers for the domain reputation score. For example, any arbitrary number may serve as the baseline value. Similarly, lettering or other symbols, such as the letter grades in school grade reports (e.g., A, B, C, D, F), may also serve as domain reputation scores. Accordingly, regardless of whether a domain reputation score is presented as a number, letter, or other symbol, this score may be set to a baseline value (e.g., zero) at step 702.

Returning to FIG. 7, at step 704 one or more of the systems described herein may adjust the domain reputation score based on a SHASTA reputation for the domain. For example, at step 704 web domain classification module 110 may determine a SHASTA reputation associated with the web domain and adjust the reputation score of the web domain based on the SHASTA reputation.

The SHASTA system may be an independent system that categorizes web domains into various categories, such as "bad," "warn," "secure," "good," and "unknown." For example, the SHASTA system may 1) categorize a web domain as "secure" if the system considers a web site to be secure, such as by determining that the web site uses SSL certificates, 2) categorize a web domain as "good" if the SHASTA system is unaware of any threats originating from the domain, 3) categorize a web domain as "warn" if the system is aware of indirect threats from the domain, 4) categorize a web domain as "bad" if the SHASTA system is aware of threats originating from the domain, and/or 5) categorize a web domain as "unknown" if the system does not know anything about the domain.

Figure 8:
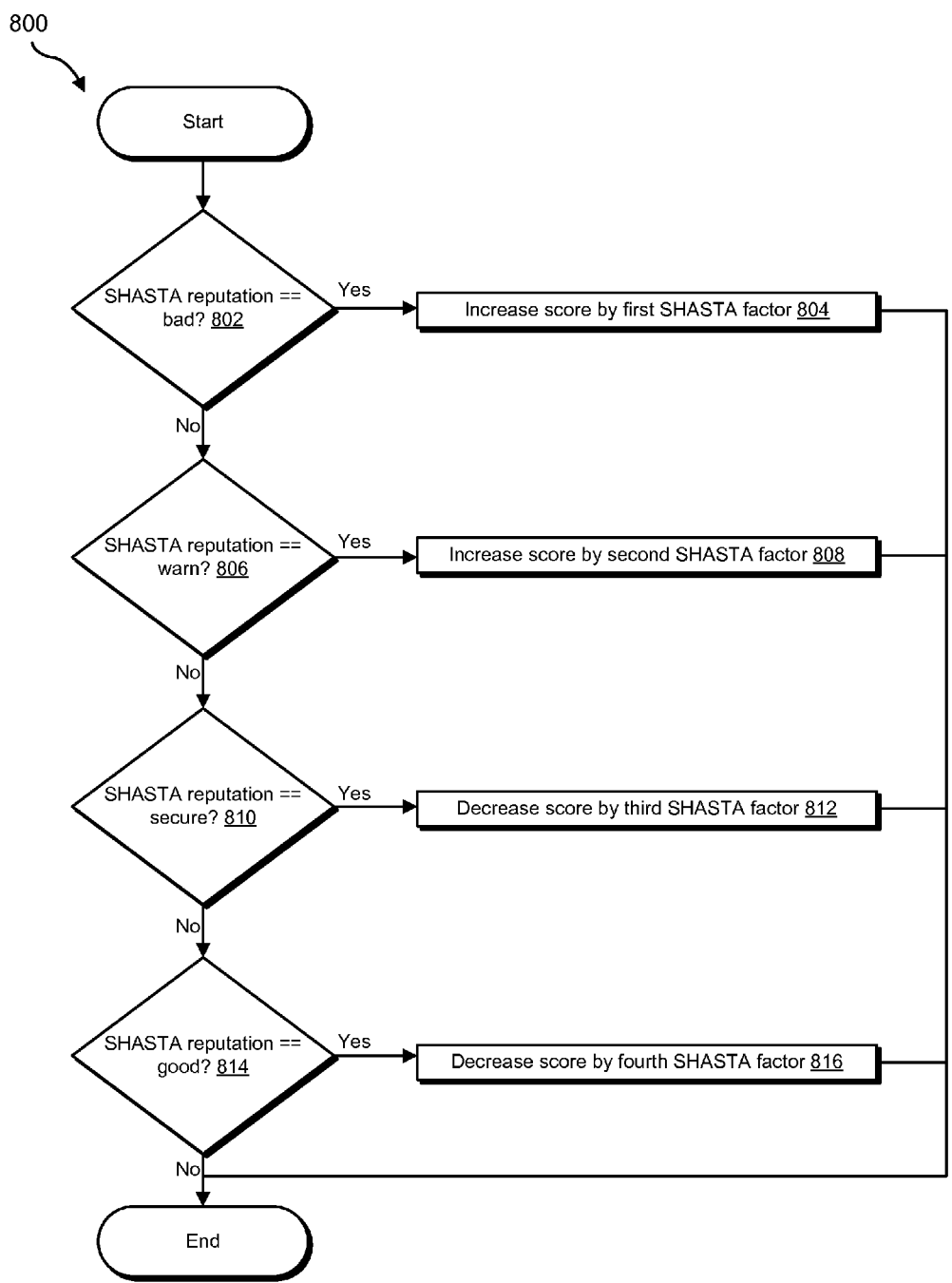
FIG. 8 is a flow diagram of an exemplary method for using client reputation data to classify web domains.

FIG. 8 illustrates a flow diagram of an exemplary computer-implemented method 800 for adjusting the web domain reputation score based on a SHASTA rating. The steps shown in FIG. 8 may be performed by any suitable computer-executable code and/or computing system. In some embodiments, the steps shown in FIG. 8 may be performed by one or more of the components of system 100 in FIG. 1 and/or system 200 in FIG. 2.

As illustrated in FIG. 8, the systems described herein may increase a web domain's reputation score by a first, second, third, or fourth SHASTA factor based on whether the SHASTA system categorizes the web domain as "bad," "warn," "secure," or "good," respectively. For example, web domain classification module 110 may increase a web domain's reputation score by a corresponding SHASTA factor based on which category the web domain belongs to, according to the SHASTA system.

For example, at each decision block 802, 806, 810, and 814, web domain classification module 110 may determine whether a SHASTA reputation associated with a particular web domain is identified as "bad," "warn," "secure," or "good," respectively. If web domain classification module 110 determines at any of decision blocks 802, 806, 810, and 814 that the SHASTA reputation associated with the web domain in question is "bad," "warn," "secure," or "good," then method 800 may proceed to corresponding step 804, 808, 812, or 816, respectively, where web domain classification module 110 may increase the web domain reputation score by a corresponding SHASTA factor.

In the above example, the first SHASTA factor may be a positive factor that is substantially larger than the second SHASTA factor. The greater size of the first SHASTA factor may reflect that the web domain at step 804 is determined to include bad threats, whereas the web domain at step 808 is determined to only include indirect threats. As examples, the first SHASTA factor may be about 30, and the second SHASTA factor may be about 5. However, these values are merely exemplary and the first and second SHASTA factors may be any values that reflect that the web domain is categorized as "bad" or "warn." For example, the first SHASTA factor may be greater in size than the second SHASTA factor, or they may be the same.

The third SHASTA factor may be any value that indicates that the web domain is categorized as secure. For example, the third SHASTA factor may be a value that is so large as to overwhelm any other positive values added to the domain reputation score by other factors or calculations in step 308. As an example, the third SHASTA factor may be about 200. That value is merely exemplary, however, and any value may be used as the third SHASTA factor that guarantees that the ultimate domain reputation score does not achieve the maliciousness threshold. Alternatively, the third SHASTA factor may be a value that is not large enough to overwhelm other positive contributions to the domain reputation score in step 308 and, therefore, does not guarantee that the web domain will not achieve the maliciousness threshold. Accordingly, the third SHASTA factor may be any value that indicates, however weakly or strongly, that the web domain is categorized as secure.

The fourth SHASTA factor may be any value that indicates that the web domain reputation is categorized as good. The fourth SHASTA factor may be substantially smaller than the third SHASTA factor, equal in size to the third SHASTA factor, or greater than the third SHASTA factor. However, the fourth SHASTA factor is preferably smaller than the third SHASTA factor. As an example, the fourth SHASTA factor may be about 30.

In the above examples, positive values (e.g., addition) are used for the first and second SHASTA factors associated with "bad" and "warn" web domain reputations. Conversely, negative values (e.g., subtraction) are used for the third and fourth SHASTA factors associated with web domain reputations categorized as "secure" or "good." However, in FIG. 8 and elsewhere herein, the systems and methods described herein are not limited to using positive values for more malicious domains and negative values for less malicious domains. Rather, the relationships may be inverted so that positive values are associated with less malicious domains, and negative values are associated with more malicious domains. In that case, domains may be classified as malicious if the web domain reputation score is less than or equal to (or merely less than) the maliciousness threshold.

In the above examples, a separate SHASTA factor may be associated with each of the four SHASTA categories: "bad," "warn," "secure," and "good." However, the systems and methods described herein are not limited to this embodiment, and one or more of the categories "bad," "warn," "secure," and "good" may use the same SHASTA factor and/or may not be associated with a SHASTA factor (e.g., web domain classification module 110 may do nothing to a web domain's reputation score when the web domain is classified into that particular category). Rather, the instant disclosure contemplates any system that determines that a web domain belongs to any of the SHASTA categories and adjusts (or fails to adjust) the web domain reputation score based on that determination.

After increasing or decreasing the web domain reputation score by its corresponding SHASTA factor, exemplary method 800 in FIG. 8 may end. Alternatively, if the systems described herein determine that the web domain in question does not have a corresponding SHASTA reputation at any of decision blocks 802, 806, 810, and 814, then the process flow of method 800 may terminate.

Figure 9:
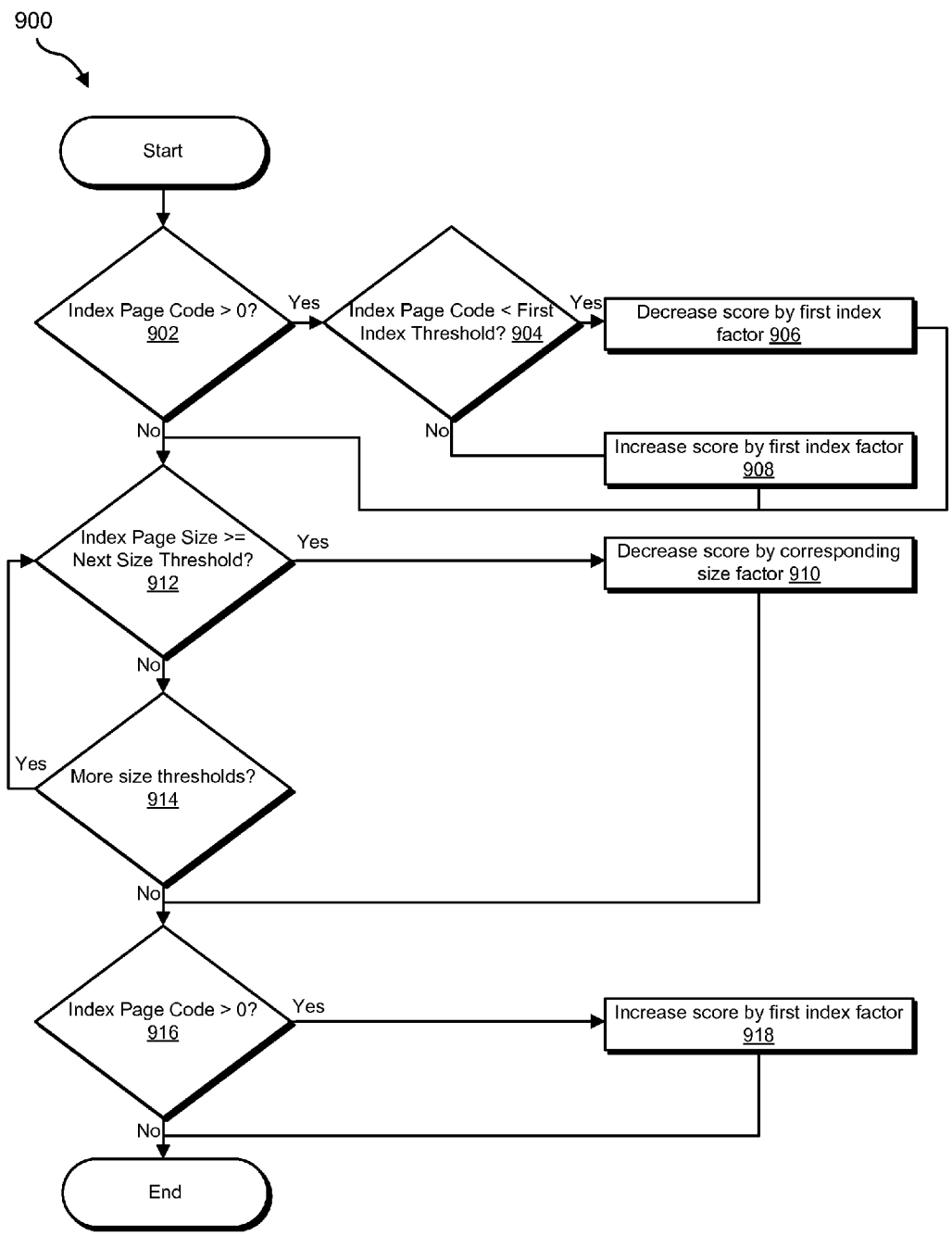
FIG. 9 is a flow diagram of an exemplary method for using client reputation data to classify web domains.

Returning to FIG. 7, at step 706 one or more of the systems described herein may adjust the web domain reputation score based on an analysis of the web domain's index page. FIG. 9 illustrates a flow diagram of an exemplary computer-implemented method 900 for adjusting the web domain reputation score based on an analysis of the web domain's index page. The steps shown in FIG. 9 may be performed by any suitable computer-executable code and/or computing system. In some embodiments, the steps shown in FIG. 9 may be performed by one or more of the components of system 100 in FIG. 1 and/or system 200 in FIG. 2.

In the example of FIG. 9, the term "index page code" may refer to an HTTP return code returned when a client visits a web domain. In addition, the term "index page size" may refer to the size of an index page returned when a client visits a web domain. For sub-domains, the domains referenced in method 900 may refer to the top level domain. For example, if the web domain in question is "downloads.microsoft.com," then the systems described herein may visit "http://www.microsoft.com."

In some examples, method 900 may ignore or discard web domain redirects. In the HTTP protocol, a redirect may be a response with a status code in the form "3XX." The status code may instruct a browser or other application to access a different web domain. Accordingly, method 900 may refuse to follow the redirect instruction by visiting the redirected web site. In method 900, web domain classification module 110 may also ignore or discard redirects in the form of "200 OK" codes combined with redirecting HTML.

As depicted in FIG. 9, at step 902 one or more of the systems described herein may determine whether the web domain's index page code is greater than zero. If so, then method 900 may proceed to decision block 904, where a determination may be made as to whether the index page code is less than a first index threshold. Unless the context indicates otherwise, references to decisions described herein that are based on a determination of "greater than" or "less than" may be interchangeable with decisions based on "greater than or equal to" or "less than or equal to." Also, percentages may generally be interchanged with proportions.

The first index threshold referenced in step 904 may be any threshold that distinguishes between two ranges of possible index page codes, where the distinction may provide the basis for inferring that a web domain is (e.g., proportionally or to that extent) more or less likely to be malicious. As an example, the first index threshold may be about 400. If the index page code is less than the first index threshold at decision block 904, then method 900 may proceed to step 906, where the web domain reputation score may be decreased by a first index factor. The first index factor may be any suitable value that serves as an increment to adjust the web domain reputation score in response to a determination that the index page code satisfies the first index threshold. As an example, the first index factor may be about 10.

If, however, the index page code is not less than the first index threshold at decision block 904, then method 900 may proceed to step 908, where web domain classification module 110 may increase the web domain reputation score by the first index factor. The web domain classification module may also or alternatively increase the web domain reputation score by an index factor that is different from the first index factor.

From steps 906 or 908, method 900 may proceed to decision block 912, where web domain classification module 110 may determine whether the index page size is greater than or equal to a first size threshold. If so, then method 900 may proceed to step 910, where web domain classification module 110 may decrease the web domain reputation score by a corresponding size factor. Accordingly, a first size threshold may be associated with a first size factor, a second size threshold may be associated with a second size factor, and so on. If the index page size is not greater than or equal to the size threshold at decision block 912, then method 900 may proceed to decision block 914, where web domain classification module 110 may determine whether there are any more size thresholds remaining. If so, then method 900 may return to decision block 912 to determine whether the index page size is greater than or equal to (or merely greater than) a next size threshold (e.g., a second size threshold).

In some examples, web domain classification module 110 may infer that a web domain is less likely to be malicious in proportion to the size of the web domain's index page. Accordingly, the first size threshold may be the largest of the size thresholds. As an example, the first size threshold may be about 15,000. Correspondingly, the first size factor may be the largest size factor. As an example, the first size factor may be about 50. Later size thresholds and size factors may decrease in magnitude from the first size threshold and size factor. As examples, size thresholds may include values of about 10,000, 5,000, 1,000, and 256. Correspondingly, size factors may include values of about 30, 15, 10, and 5, respectively. These values are merely exemplary, however, and the instant disclosure contemplates systems and methods that adjust a web domain's reputation score by any value in proportion to the domain's index page size to indicate that the web domain is less likely to be malicious.

If there are no more size thresholds at decision block 914, method 900 may then proceed to decision block 916, where web domain classification module 110 may determine whether the index page code is greater than zero. If so, then method 900 may proceed to step 918, where web domain classification module 110 may increase the web domain reputation score by the first index factor. Alternatively, web domain classification module 110 may increase the web domain reputation score by a factor that is larger or smaller than the first index factor, or otherwise adjust the web domain reputation score based on a determination that the index page code is larger than zero. That is, web domain classification module 110 may infer that the web domain is more likely to be malicious if the index page code is greater than zero. If the index page code is not greater than zero at decision block 916, or after the completion of step 918, method 900 may end.

Although in the above example method 900 proceeds through analyzing the size thresholds and size factors in decreasing order, the instant disclosure contemplates systems and methods that may analyze the size thresholds and size factors in any order. Further, although in the above example a decrease in a size threshold from a previous size threshold is associated with a corresponding decrease in a size factor from a previous size factor, the disclosed systems and methods are not limited to that feature. Rather, the instant disclosure contemplates systems and methods that may adjust a domain reputation score to decrease, however slightly or greatly, an estimate of likelihood of the web domain being malicious based on a determination that the web domain index page satisfies a size threshold. Further, and as with all methods disclosed herein, one or more of the steps in method 900 may be omitted or performed separately. For example, the groups of steps 902-908, 910-914, and 916-918 may each be performed independently of each other.

Returning to FIG. 7, at step 708 one or more of the systems described herein may adjust the web domain reputation score based on direct reputations of applications that hit the domain. For example, web domain classification module 110 may adjust the web domain reputation score to infer that the web domain is more likely to be malicious if a percent or proportion of applications hitting the domain that are known to be malicious or suspect is greater than the percent of applications hitting the domain that are known to be malicious or not suspect (e.g., in proportion to the percent or proportion of those applications).

Figure 10:
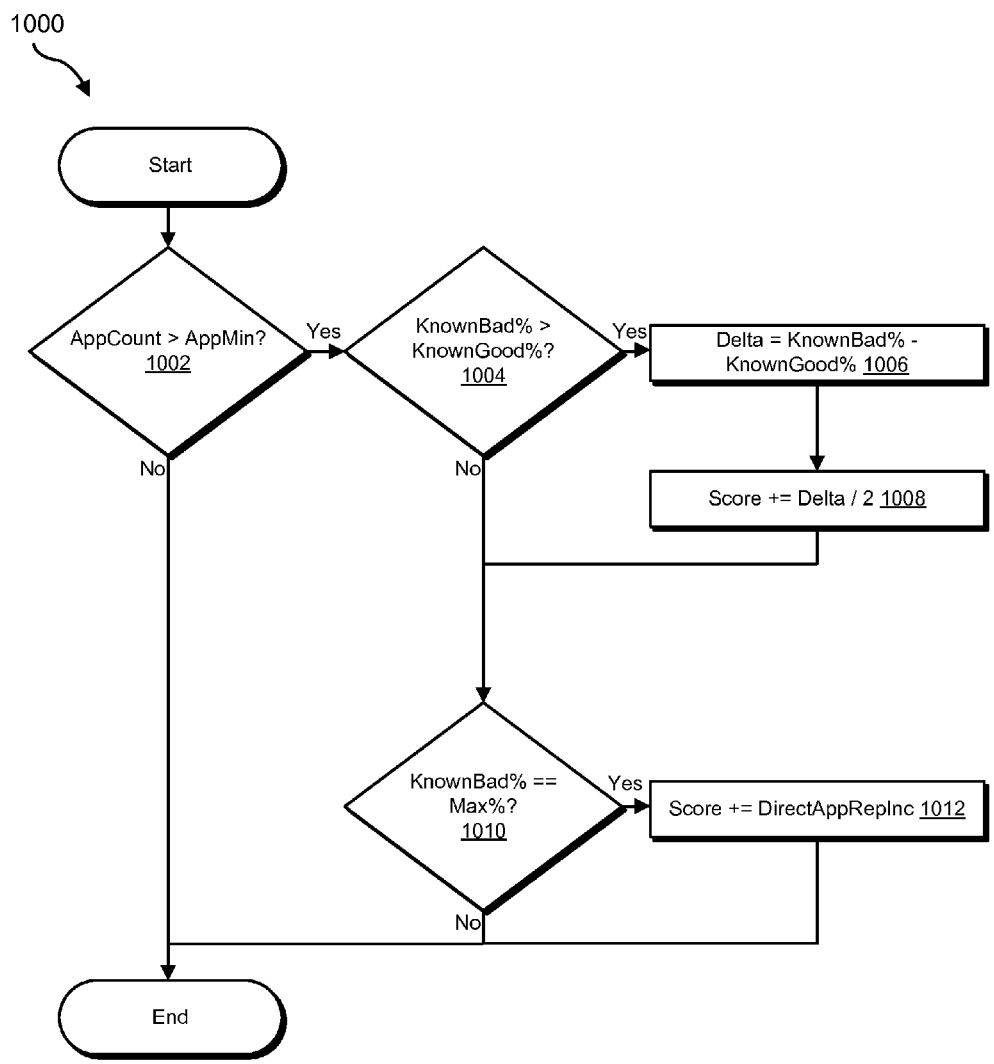
FIG. 10 is a flow diagram of an exemplary method for using client reputation data to classify web domains.

FIG. 10 illustrates a flow diagram of an exemplary computer-implemented method 1000 for adjusting the web domain reputation score in accordance with step 708 of FIG. 7. The steps shown in FIG. 10 may be performed by any suitable computer-executable code and/or computing system. In some embodiments, the steps shown in FIG. 10 may be performed by one or more of the components of system 100 in FIG. 1 and/or system 200 in FIG. 2.

Method 1000 shown in FIG. 10 may adjust the web domain reputation score based on reputations that are fetched from independent, third-party services, such as MR. CLEAN and THREAT FIRE. In method 1000, web domain classification module 110 may also fetch reputations from a BASH conviction or BASH label, as described above in connection with FIG. 4. If any of these sources, such as the application reputation sources 412 shows in FIG. 4, indicate that the application is malicious, web domain classification module 110 may add the application to a list of malicious applications. Otherwise, if any of the sources indicate that the application is non-malicious, web domain classification module 110 then may add the application to a list of non-malicious applications. Lastly, if the sources do not indicate whether the application is malicious or non-malicious, then the application may then be added to a list of unknown applications.

In FIG. 10, the term "KnownBad %" may refer to a percentage of applications hitting the web domain that are known to be malicious. Conversely, the term "KnownGood %" may refer to a percentage of applications hitting the web domain that are known to be non-malicious. In addition, the term "AppCount" may refer to the number of applications hitting the web domain.

At decision block 1002, web domain classification module 110 may determine whether AppCount is greater than a minimum number of applications. Web domain classification module 110 may ensure that the number is larger than the minimum number, to ensure that there is sufficient data so that the heuristic of method 1000 may achieve a desired level of accuracy. As an example, the minimum number of applications may be about ten.

If AppCount is greater than the minimum number of applications at decision block 1002, method 1000 may then proceed to decision block 1004, where web domain classification module 110 may determine whether KnownBad % is greater than KnownGood %. That is, web domain classification module 110 may determine whether, of applications hitting the web domain in question, the number, proportion, or percentage of those applications that are known to be bad is greater than the number, proportion, or percentage of those applications known to be good. If the determination is that Known-Bad % is greater than KnownGood % at decision block 1004, then method 1000 may proceed to step 1006, where web domain classification module 110 may assign the difference between the number, proportion, or percentage of KnownBad applications and the number, proportion, or percentage of KnownGood applications to a delta value. From step 1006, method 1000 may proceed to step 1008, where web domain classification module 110 may adjust (e.g., increase) the web domain reputation score by about half of the delta value.

If KnownBad % is not greater than KnownGood % at decision block 1004, or after the completion of step 1008, method 1000 may then proceed to decision block 1010, where web domain classification module 110 may determine whether the number, proportion, and/or percentage of KnownBad applications, as described above, is equal to a maximum amount. As an example, the maximum amount may be about 100%. If the determination is that the number, proportion, and/or percentage of KnownBad application is equal to the maximum amount at decision block 110, then method 1000 may proceed to step 1012, where web domain classification module 110 may increase the web domain reputation score by an increment for method 1000 based on the direct reputations of applications (labeled DirectAppRepInc in FIG. 10). As an example, the increment may be a value of about ten. The exemplary systems and methods described herein are not limited to an increment of about ten, however, and the instant disclosure contemplates systems and methods that may adjust the web domain reputation score by any increment based on a determination that the percentage of applications hitting the domain that are known to be malicious is equal to a maximum percentage, indicating that the web domain is more likely to be malicious. If the determination is that the number of KnownBad applications does not equal the maximum amount at decision block 1010, or after the completion of step 1012, method 1000 may then end.

Although, in the above example, web domain classification module 110 adjusts the web domain reputation score by about half to the delta value at step 1008, the instant disclosure is not limited to that particular method of adjustment. Rather, the instant disclosure contemplates exemplary systems and methods that may adjust the web domain reputation score by any increment in response to a determination that a number, proportion, and/or percentage of applications that hit the domain that are known to be malicious is greater than a number, proportion, and/or percentage of applications hitting the domain that are known to be non-malicious. The increment may be arbitrary, proportional to the number, proportion, and/or percent of applications known to be malicious, proportional to the number, proportion, and/or percent of applications that are known to be non-malicious, and/or proportional to both the number, proportion, and/or percent of applications that are known to be malicious and known to be non-malicious.

Returning to FIG. 7, at step 710 one or more of the systems described herein may adjust the web domain reputation score based on downloads from known domains. For example, web domain classification module 110 may adjust the web domain reputation score based on a number, proportion, and/or percentage of hits to all domains, not just the web domain being classified, from applications that are known to be good or known to be bad.

Figure 11:
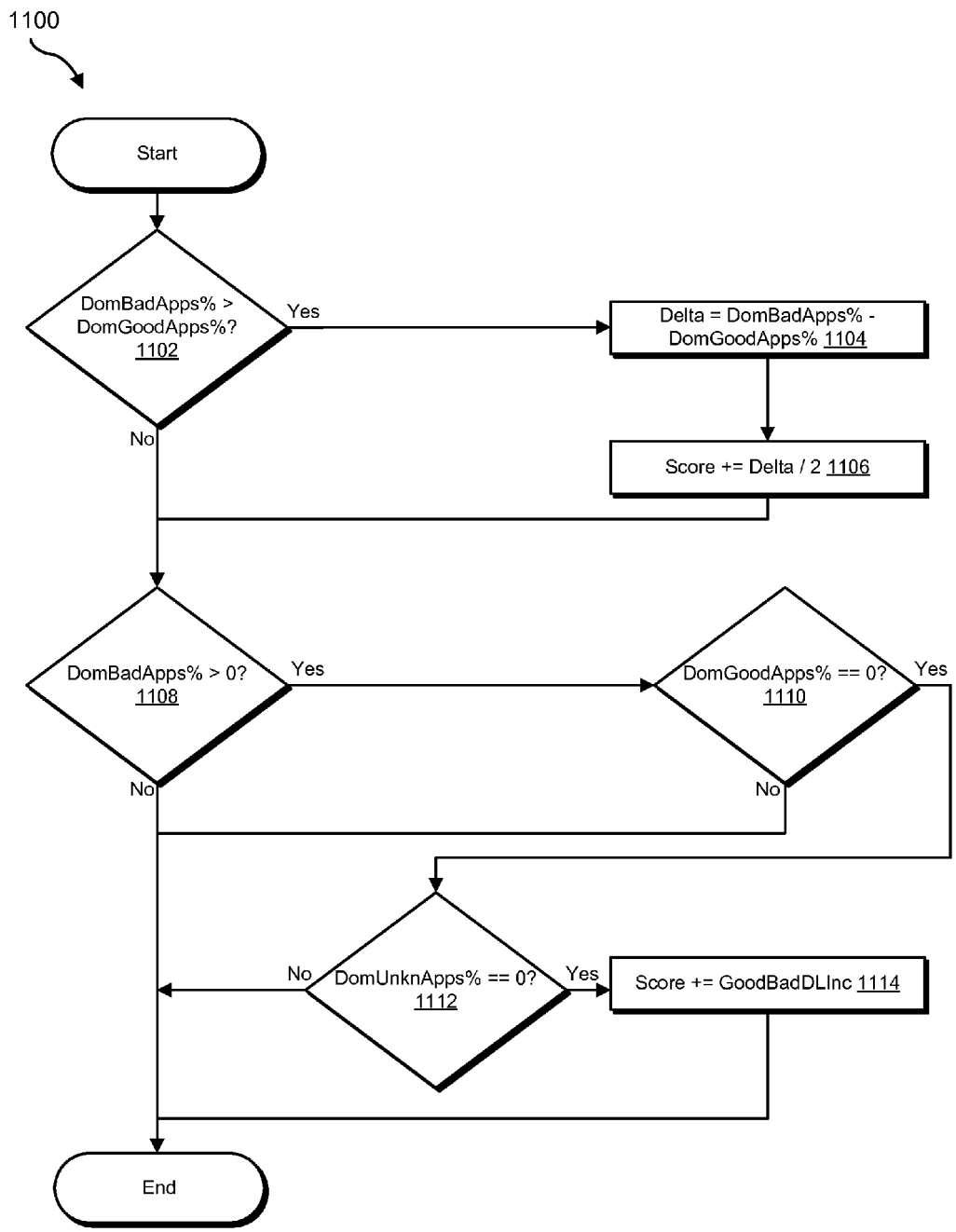
FIG. 11 is a flow diagram of an exemplary method for using client reputation data to classify web domains.

FIG. 11 illustrates a flow diagram of an exemplary computer-implemented method 1100 for adjusting the web domain reputation score based on downloads from known domains in accordance with step 710 of FIG. 7. The steps shown in FIG. 11 may be performed by any suitable computer-executable code and/or computing system. In some embodiments, the steps shown in FIG. 11 may be performed by one or more of the components of system 100 in FIG. 1 and/or system 200 in FIG. 2.

In FIG. 11, the term "DomBadApps" may refer to the total number of hits to all domains, not just the web domain being classified, from applications that are known to be malicious. Conversely, the term "DomGoodApps" may refer to the total number of hits to all domains, not just the web domain being classified, from applications that are known to be non-malicious. Similarly, the term "DomUnknApps" may refer to the total number of hits to all domains, not just the web domain being classified, from applications that have unknown reputations. In addition, the term "Total Hits" may refer to the total number of hits to all domains from applications that are being monitored (and not just the web domain being classified). Finally, the terms "DomBadApps %" and "DomGoodApps %" may refer to DomBadApps multiplied by 100 and then divided by Total Hits and DomGoodApps multiplied by 100 and divided by Total Hits, respectively.

At step 1102, web domain classification module 110 may determine whether DomBadApps % is greater than Dom-GoodApps %. If so, then method 1100 may proceed to step 1104, where web domain classification module 110 may assign a difference between DomBadApps % and Dom-GoodApps % to a delta value. From step 1104, method 1100 may proceed to step 1106, where web domain classification module 110 may adjust (e.g., increase) the web domain reputation score by about half of the delta value.

If DomBadApps % is not greater than DomGoodApps % at decision block 1102, or after completion of step 1106, method 1100 may then proceed to decision block 1108, where web domain classification module 110 may determine whether DomBadApps % is greater than zero. If so, then method 1100 may proceed to decision block 1110, where web domain classification module 110 may determine whether DomGoodApps % is equal to zero. If so, then method 1100 may proceed to decision block 1112, where web domain classification module 110 may determine whether DomUnknApps % is equal to zero. If so, then method 1100 may proceed to step 1114, where web domain classification module 110 may adjust (e.g., increase) the web domain reputation score by an increment based on the downloads from known domains (labeled GoodBadDLInc in FIG. 11). If the determination is no at any of decision blocks 1108, 1110, and 1112 (i.e., if DomBadApps % is not greater than zero, if DomGoodApps % is not equal to zero, or if DomUnknApp % is not equal to zero), then method 1100 may end. Accordingly, by executing steps 1108-1114 of method 1100, web domain classification module 110 may ensure that the web domain reputation score is adjusted by the increment only in the case that DomBadApps % is greater than 0, DomGoodApps % is equal to 0, and DomUnknApps is equal to 0. That is, when the determination is yes at each and every of the decision blocks 1108, 1110, and 1112 (e.g., when the monitored hits are only from malicious applications), web domain classification module 110 may then infer, however weakly or strongly, that the web domain is more likely to be malicious. As an example, the increment may be a value of about ten. That example is merely exemplary, however, and the instant disclosure contemplates systems and methods that may adjust the web domain reputation score at step 1114 by any arbitrary increment to indicate that the web domain is more likely to be malicious.

As with FIG. 10, method 1100 in FIG. 11 is not limited to embodiments that adjust the web domain reputation score at step 1106 by about half of the delta value. Rather, the instant disclosure contemplates systems and methods that adjust the web domain reputation score by any increment that may be arbitrary or may be proportional to one or more of DomBadApps, DomGoodApps, DomBadApps %, and DomGoodApps % to thereby indicate that the web domain is more likely to be malicious.

Further, and as with all of the methods disclosed herein, one or more steps in method 1100 may be omitted or performed separately. For example, each of the groups of steps 1102-1106 and 1108-1114 may be performed independently of each other. Further, the order of steps 1108, 1110, and 1112 may be interchanged.

Returning to FIG. 7, at step 712 one or more of the systems described herein may adjust the web domain reputation score based on indirect reputations of the applications hitting the web domain. For example, web domain classification module 110 may adjust the web domain reputation score based on the number of applications hitting the web domain that hit other web domains that are known to be malicious.

Figure 12:
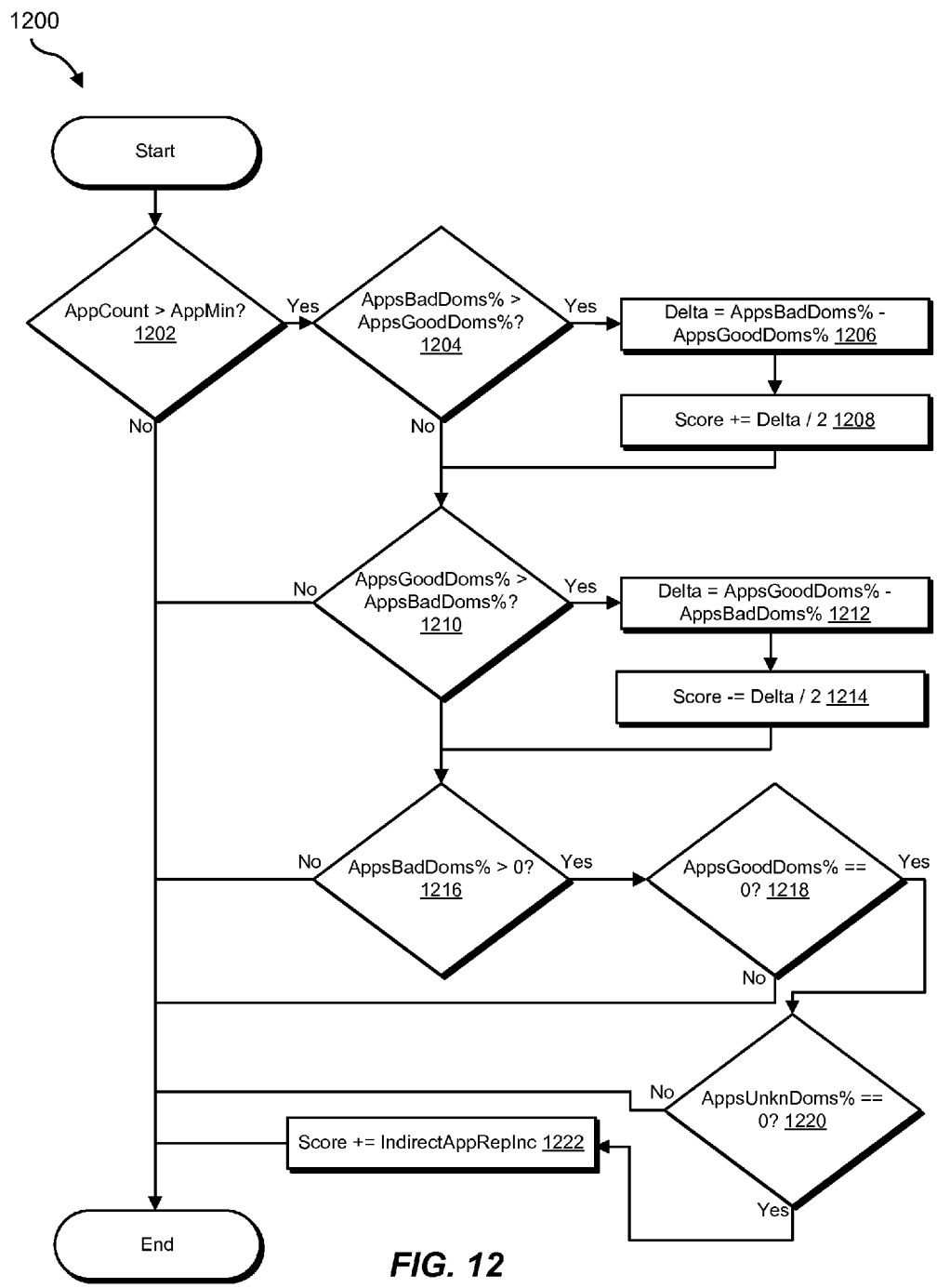
FIG. 12 is a flow diagram of an exemplary method for using client reputation data to classify web domains.

FIG. 12 illustrates a flow diagram of an exemplary computer-implemented method 1200 for adjusting the web domain reputation score based on indirect reputations of the applications hitting that domain in accordance with step 712 in FIG. 7. The steps shown in FIG. 12 may be performed by any suitable computer-executable code and/or computing system. In some embodiments, the steps shown in FIG. 12 may be performed by one or more of the components of system 100 in FIG. 1 and/or system 200 in FIG. 2.

In FIG. 12, the term "AppsBadDoms %" may refer to the percentage of applications hitting the web domain that hit other web domains that are known to be malicious. Similarly, the term "AppsGoodDoms %" may refer to the percentage of applications hitting the web domain that hit other web domains that are known to be non-malicious. Also, the term "AppsUnknownDoms %" may refer to the percentage of applications hitting the web domain that hit other web domains of unknown reputation. As discussed above regarding FIG. 10, the term "AppCount" may refer to the number of applications hitting the web domain.

At decision block 1202, web domain classification module 110 may determine whether AppCount is greater than a minimum number of applications. As an example, the minimum number of applications may be about 10. If App Count is greater than the minimum number of applications at decision block 1202, method 1200 may then proceed to decision block 1204, where web domain classification module 110 may determine whether AppsBadDoms % is greater than AppsGoodDoms %. That is, web domain classification module 110 may determine whether the percentage of applications hitting the web domain that also hit a malicious domain is greater than the percentage of applications hitting the web domain that also hit a non-malicious domain. If so, then method 1200 may proceed to step 1206, where web domain classification module 110 may assign a difference between AppsBadDoms % and AppsGoodDoms % to a delta value.

From step 1206, method 1200 may proceed to step 1208, where web domain classification module 110 may adjust (e.g., increase) the web domain reputation score by about half of the delta value. That is, web domain classification module 110 may infer that the web domain is more likely to be malicious based on one or more other web domains that applications hitting the web domain being classified hit (e.g., in proportion to the number or proportion of malicious web domains being hit). In particular, web domain classification module 110 may infer that the web domain is more likely to be malicious based on a comparison between a number, proportion, and/or percent of applications hitting the web domain that hit one or more malicious domains and a number, proportion, and/or percent of applications hitting the web domain that hit one or more non-malicious domains (e.g., more likely in proportion to the difference between those compared values).

If AppsBadDoms % is not greater than AppsGoodDoms % at decision block 1204, or after the completion of step 1208, then method 1200 may proceed to decision block 1210, where web domain classification module 110 may determine whether AppsGoodDoms % is greater than AppsBadDoms %. That is, web domain classification module 110 may determine whether a number, proportion, and/or percentage of applications hitting the domain that hit one or more web domains that are known to be non-malicious is greater than a number, proportion, and/or percentage of applications hitting the domain that also hit web domains that are known to be malicious. If so, then method 1200 may proceed to step 1212, where web domain classification module 110 may assign a difference between AppsGoodDoms % and AppsBadDoms % to a delta value. From step 1212, method 1200 may proceed to step 1214, where web domain classification module 110 may adjust (e.g., decrease) the web domain reputation score by about half of the delta value.

If AppsGoodDoms % is not greater than AppsBadDoms % at step 1210, or after the completion of step 1214, method 1200 may then proceed to decision block 1216, where web domain classification module 110 may determine whether AppsBadDoms % is greater than zero. If so, then method 1200 may proceed to decision block 1218, where web domain classification module 110 may determine whether AppsGoodDoms % is equal to zero. If so, then method 1200 may proceed to decision block 1220, where web domain classification module 110 may determine whether AppsUnknDoms % is equal to zero. If so, then method 1200 may proceed to step 1222, where web domain classification module 110 may adjust (e.g., increase) the web domain reputation score by an increment based on indirect reputations of the application hitting the domain (labeled IndirectAppRepInc in FIG. 12).

Thus, by executing steps 1216-1222 of method 1200, web domain classification module 110 may ensure that the web domain reputation score is only adjusted by the increment in the case that the decision is yes at each and every of decision blocks 1216, 1218, and 1220. That is, if AppsBadDoms % is greater than 0, AppsGoodDoms % equals 0, and AppsUnknDoms % equals zero, then web domain classification module 110 may infer, however weakly or strongly, that the web domain is more likely to be malicious. As an example, the increment at step 1222 may be a value of about ten. However, the instant disclosure is not limited to the value of ten at step 1222, and the instant disclosure contemplates systems and methods that use any arbitrary increment at step 1222 to thereby indicate that the web domain is more likely to be malicious. If the decision is no at any of decision blocks 1216, 1218, and 1220 (i.e., if AppsBadDoms % is not greater than zero, if AppsGoodDoms is not equal to zero, or if AppsUnknDoms % is not equal to zero), then method 1200 may end.

As discussed above regarding FIGS. 10 and 11, in the above example, method 1200 adjusts the web domain reputation score by about half of the delta value at steps 1208 and 1214. However, the instant disclosure is not limited to the use of those particular delta values at steps 1208 and 1214. Rather, the instant disclosure contemplates systems and methods that may adjust the web domain reputation score by any increment based on a determination that a number, proportion, and/or percentage of applications hitting the web domain that hit one or more web domains known to be malicious achieves a threshold amount, to thereby indicate that the web domain is more or less likely to be malicious. Specifically, the instant disclosure contemplates systems and methods that may adjust the web domain reputation score by any increment based on a comparison of a number, proportion, and/or percentage of applications hitting the web domain that also hit one or more web domains known to be malicious with a number, proportion, and/or percentage of applications hitting the web domain that also hit one or more web domains that are known to be non-malicious.

As with all of the methods disclosed herein, one or more steps in method 1200 may be omitted or performed separately. For example, step 1202 is optional. Further, the groups of steps 1204-1208, 1210-1214, and 1216-1220 may be performed independently of each other. The order of steps 1216-1220 may also be interchanged.

Returning to FIG. 7, at step 714 one or more of the systems described herein may adjust the web domain reputation score based on a number of hits to known domains. For example, web domain classification module 110 may adjust the web domain reputation score based on a number, proportion, and/or percentage of hits to domains that are known to be malicious or known to be non-malicious from all of the applications that hit the web domain.

Figure 13:
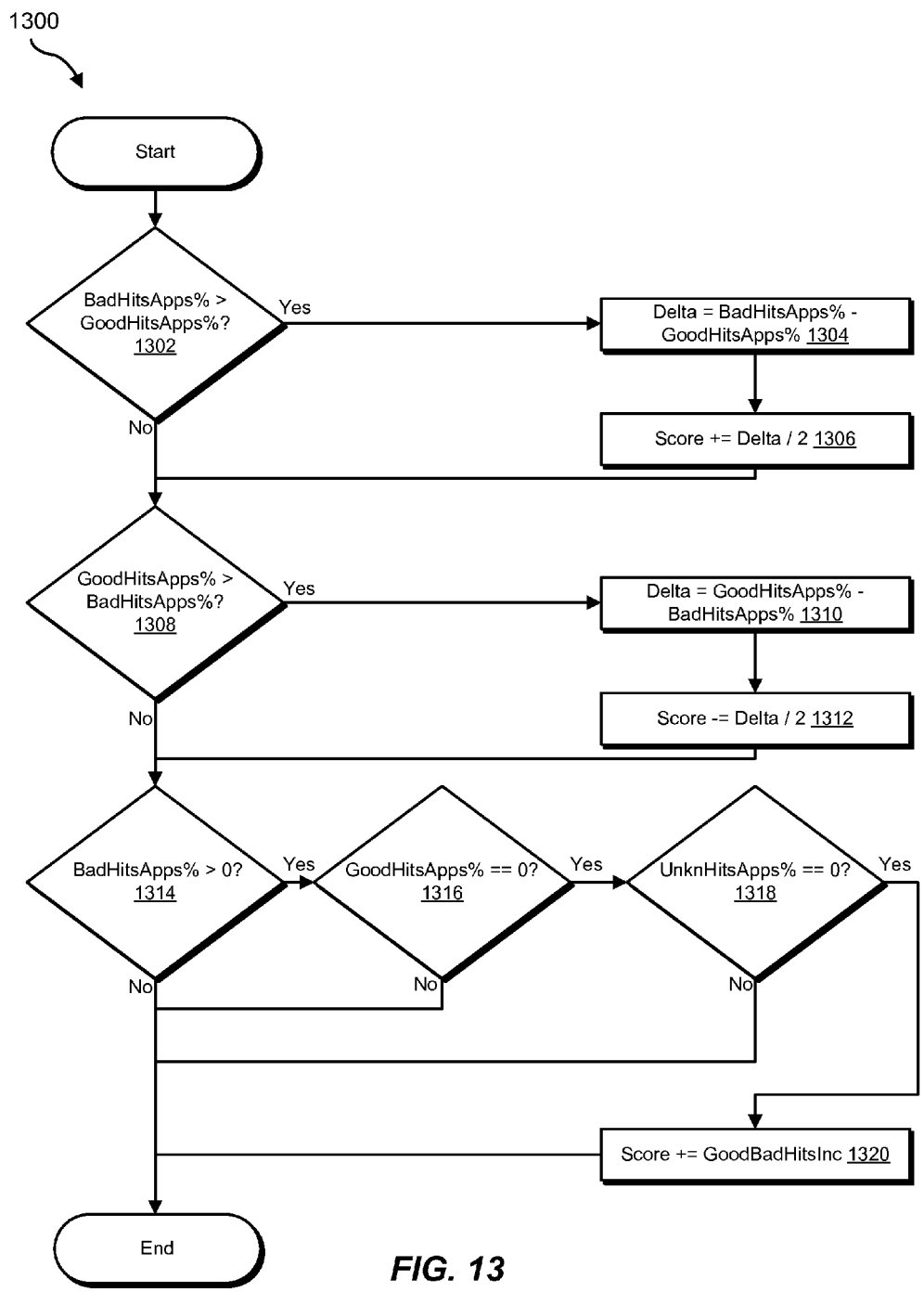
FIG. 13 is a flow diagram of an exemplary method for using client reputation data to classify web domains.

FIG. 13 illustrates a flow diagram of an exemplary computer-implemented method 1300 for adjusting the web domain reputation score based on a number of hits to known domains in accordance with step 714 of FIG. 7. The steps shown in FIG. 13 may be performed by any suitable computer-executable code and/or computing system. In some embodiments, the steps shown in FIG. 13 may be performed by one or more of the components of system 100 in FIG. 1 and/or system 200 in FIG. 2.

In FIG. 13, the term "BadHitsApps %" may refer to the percentage of hits from all applications hitting the web domain that hit to web domains that are known to be malicious. Similarly, the term "GoodHitsApps %" may refer to the percentage of hits from all applications hitting the web domain that hit to web domains that are known to be non-malicious. Also, the term "UnknHitsApps %" may refer to the percentage of hits from all apps hitting the web domain that hit to web domains of unknown reputation. Thus, web domain classification module 110 may base the classification of the web domain based on the maliciousness of web domains that applications hitting the web domain also hit. That is, web domain classification module 110 may determine whether, of all of the hits from all apps to the web domain, there are more hits to web domains that are known to be malicious than hits to web domains that are known to be non-malicious.

If BadHitsApps % is greater than GoodHitsApps % at decision block 1302, then method 1300 may proceed to step 1304, where web domain classification module 110 may assign a difference between BadHitsApps % and GoodHitsApps % to a delta value. From step 1304, method 1300 may proceed to step 1306, where web domain classification module 110 may adjust (e.g., increase) the web domain reputation score by about half of the delta value. That is, if, of all of the hits from all of the applications that hit the web domain, there are more hits to web domains that are known to be malicious than hits to web domains that are known to be non-malicious, web domain classification module 110 may then infer, however weakly or strongly (e.g., in proportion to the difference between the compared numbers or proportions of hits), that the web domain is more likely to be malicious.

If BadHitsApps % is not greater than GoodHitsApps % at decision block 1302, or after completion of step 1306, method 1300 may then proceed to decision block 1308, where web domain classification module 110 may determine whether GoodHitsApps % is greater than BadHitsApps %. If so, method 1300 may then proceed to step 1310, where web domain classification module 110 may assign a difference between GoodHitsApps % and BadHitsApps % to a delta value. From step 1310, method 1300 may proceed to step 1312, where web domain classification module 110 may adjust (e.g., decrease) the web domain reputation score by about half of the delta value.

If GoodHitsApps % is not greater than BadHitsApps % at decision block 1308, or after completion of step 1312, method 1300 may then proceed to decision block 1314, where web domain classification module 110 may determine whether BadHitsApps % is greater than zero. If so, then method 1300 may proceed to decision block 1316, where web domain classification module 110 may determine whether GoodHitsApps % is equal to zero. If so, then method 1300 may proceed to decision block 1318, where web domain classification module 110 may determine whether UnknHitsApps % is equal to zero. If so, then method 1300 may then proceed to step 1320, where web domain classification module 110 may adjust (e.g., increase) the web domain reputation score by an increment for adjusting the web domain reputation based on a number of hits to known domains in accordance with step 714 of FIG. 7. As an example, the increment at step 1320 may be a value of about ten. However, the instant disclosure is not limited to increments of about ten at step 1320 and contemplates systems and methods using increments of any arbitrary value to thereby indicate that the web domain is more likely to be malicious. If the decision is no at any of decision blocks 1314, 1316, and 1318 (i.e., if BadHitsApps % is not greater than zero, if GoodHitsApps % is not equal to zero, or if UnknHitsApps % is not equal to zero), then method 1300 may end.

By executing steps 1314-1320 of method 1300, web domain classification module 110 may ensure that the web domain reputation score is adjusted at step 1320 only in the case that the determination is yes at each of the decision blocks 1314, 1316, and 1318. That is, in the case that the percentage of hits to web domains that are known to be malicious is greater than zero and only zero percent of the hits are to web domains that are known to be non-malicious or of unknown reputation (e.g., when the monitored hits are only to malicious web domains), then web domain classification module 110 may then infer, however weakly or strongly (e.g., in proportion to the number or proportion of hits to malicious web domains), that the web domain is more likely to be malicious.

As in FIGS. 10-12, in the above example, method 1300 adjusts the web domain reputation score by about half of the delta value at steps 1306 and 1312, but the application is not limited to adjusting the web domain reputation score by about half of the delta value as shown in FIG. 13. Rather, web domain classification module 110 may adjust the web domain reputation score by any increment at steps 1306 and 1312. That is, the increment may be arbitrary or proportional to one or more of the number, proportion, and/or percent of hits from all applications hitting the web domain to web domains that are known to be malicious or hits from all applications hitting the web domain to web domains that are known to be non-malicious, to thereby indicate that the web domain is more or less likely to be malicious.

As with all of the methods disclosed herein, one or more steps of method 1300 may be omitted or performed separately. For example, the groups of steps 1302-1306, 1308-1312, and 1314-1320 may be performed independently of each other. Further, the order of steps 1314-1318 may be interchanged.

Returning to FIG. 7, at step 716, one or more of the systems described herein may adjust the web domain reputation score based on a percentage of applications with suspicious names. For example, web domain classification module 110 may search the names of applications hitting the web domain (e.g., all applications or substantially all applications hitting the web domain) for suspicious terms (e.g., malware, hijack, virus, worm, etc.).

In some examples, web domain classification module 110 may compute a number, proportion, or percentage of applications hitting the web domain that have suspicious names. Web domain classification module 110 may then adjust the web domain reputation score based on the percentage of applications having suspicious names. That is, web domain classification module 110 may infer that the web domain is more likely to be malicious in proportion to the number, proportion, and/or percent of applications having suspicious names. As an example, web domain classification module 110 may adjust the web domain reputation score by dividing the number of the percentage (e.g., the number 10 for the percentage 10%) of applications with suspicious names by a value of about 10 and adding the resulting number to the web domain reputation score. However, the instant disclosure is not limited to adjusting the web domain reputation score in that particular manner. Rather, the instant disclosure contemplates systems and methods that adjust the web domain reputation score by any increment, or by any other manner, indicating that the web domain is more likely to be malicious based on the web domain being hit by more applications having suspicious names.

Returning to FIG. 7, at step 718 one or more of the systems described herein may adjust the web domain reputation score based on a number or proportion of good or/or bad users. For example, web domain classification module 110 may adjust the web domain reputation score based on a number, proportion, and/or percent of good or bad users that hit the web domain.

Users may have at least two kinds of reputations. First, users may have reputations based on whether applications that hit web domains from the user are known to be malicious or non-malicious. Second, users may have reputations based on whether the web domains that hit from the user are known to be malicious or non-malicious.

Figure 14:
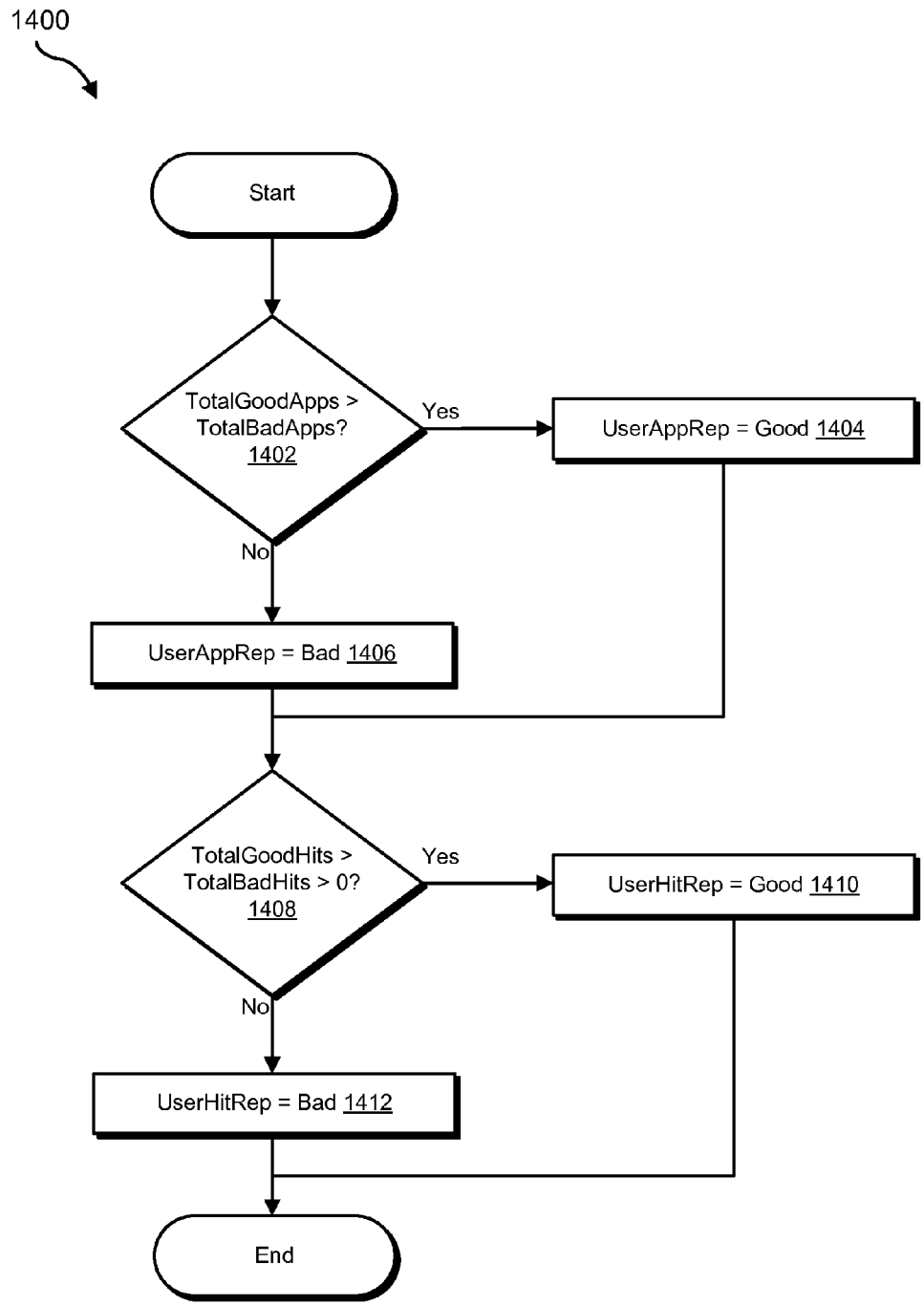
FIG. 14 is a flow diagram of an exemplary method for using client reputation data to classify web domains.

FIG. 14 illustrates a flow diagram of an exemplary computer-implemented method 1400 for determining the reputations of users based on the applications that hit web domains from the user and based on the web domains that hit from the user. The steps shown in FIG. 14 may be performed by any suitable computer-executable code and/or computing system. In some embodiments, the steps shown in FIG. 14 may be performed by one or more of the components of system 100 in FIG. 1 and/or system 200 in FIG. 2.

As illustrated in FIG. 14, at decision block 1402 web domain classification module 110 may determine whether, of applications hitting web domains from the user, more applications are known to be non-malicious than are known to be malicious. If so, then method 1400 may proceed to step 1404, where web domain classification module 110 may assign a good reputation to the user based on the applications hitting web domains from the user. If, however, there are not more applications that are known to be non-malicious than are known to be malicious at decision block 1402, then method 1400 may proceed to step 1406, where web domain classification module 110 may assign a low reputation to the user based on the applications hitting web domains from the user.

From steps 1404 or 1406, method 1400 may proceed to decision block 1408, where web domain classification module 110 may determine whether, of all of the hits to web domains from the user, more hits are to web domains that are known to be non-malicious than are to web domains that are known to be malicious. If so, method 1400 may then proceed to step 1410, where web domain classification module 110 may assign a good reputation to the user based on the hits from that user. If the decision is that there are not more hits to web domains that are known to be non-malicious than are to web domains that are known to be malicious at decision block 1408, then method 1400 may proceed to step 1412, where web domain classification module 110 may assign a low reputation to the user based on the hits to web domains from that user. From step 1410 or 1412, method 1400 may end.

Although in the above example the reputation of the user is assigned at steps 1404, 1406, 1410, and/or 1412 based on whether the number of good applications is greater than the number of bad applications or whether the number of good domain hits is greater than the number of bad domain hits, the systems and methods disclosed herein are not limited to assigning the user reputation based on those particular calculations. Rather, the instant disclosure contemplates systems and methods that determine the reputation of the user based on any comparison of a number, proportion, and/or percentage of applications known to be malicious or non-malicious with a threshold. Specifically, the instant disclosure contemplates systems and methods that determine the reputation of the user based on any comparison of a number, proportion, and/or percentage of applications known to be malicious with applications known to be non-malicious and/or a comparison of a number, proportion, and/or percentage of hits to web domains known to be malicious with hits to web domains known to be non-malicious.

Further, although in the above example the user is assigned a binary reputation of either "good" or "bad," the instant disclosure is not limited to those binary categories. Rather, the instant disclosure contemplates adjusting any reputation information about the user (e.g., reputation information or reputation score along a gradient or scale) based on the above discussed comparisons.

As with all of the methods disclosed herein, one or more steps of method 1400 may be omitted or performed separately. For example, the groups of steps 1402-1406 and 1408-1410 may be performed independently of each other.

Figure 15:
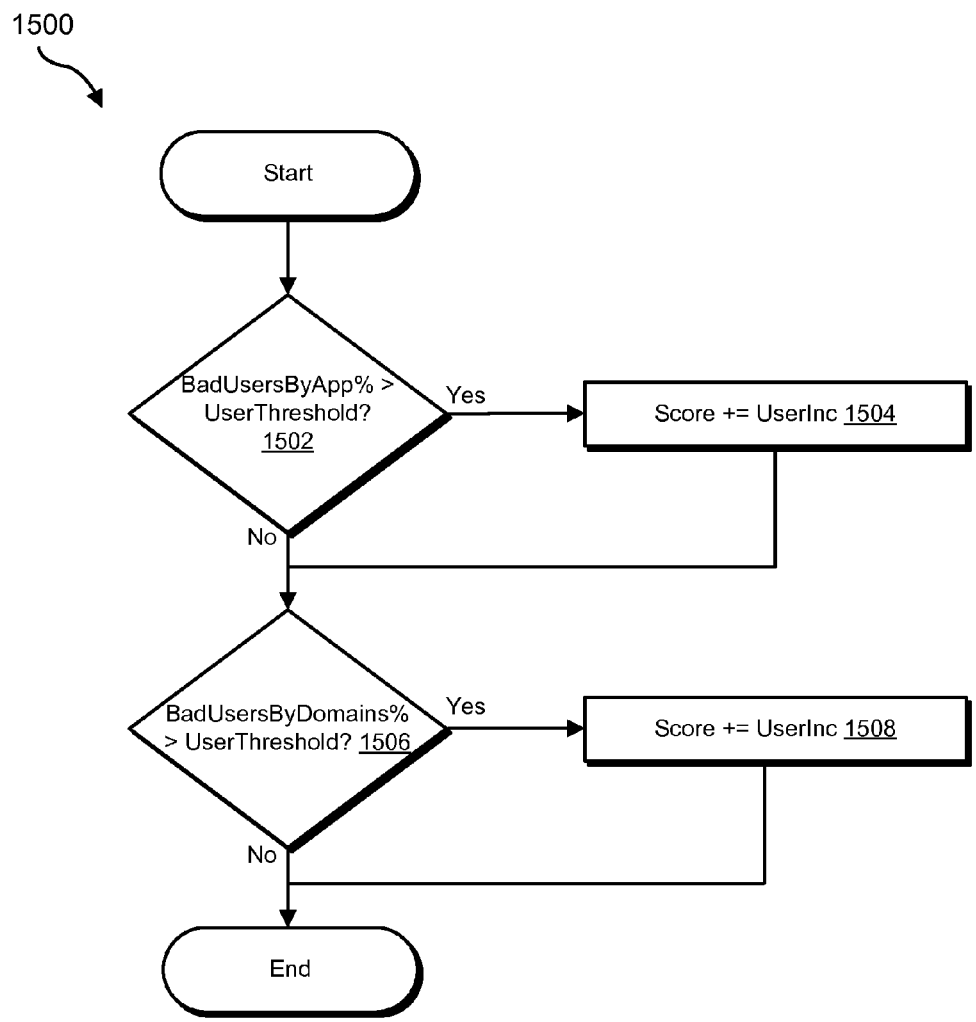
FIG. 15 is a flow diagram of an exemplary method for using client reputation data to classify web domains.

FIG. 15 illustrates a flow diagram of an exemplary computer-implemented method 1500 for adjusting the web domain reputation score based on a number of good or bad users in accordance with step 718 of FIG. 7. The steps shown in FIG. 15 may be performed by any suitable computer-executable code and/or computing system. In some embodiments, the steps shown in FIG. 15 may be performed by one or more of the components of system 100 in FIG. 1 and/or system 200 in FIG. 2.

In FIG. 15, the term "BadUsersByApp %" may refer to the percentage of users hitting the web domain that have low reputations based on the applications hitting web domains from that user, as discussed above regarding FIG. 14. Similarly, the term "BadUsersByDomains %" may refer to the percentage of users hitting the web domain that have low reputations based on the web domain hits from the user, as also discussed above regarding FIG. 14.

At decision block 1502, web domain classification module 110 may determine whether BadUsersByApp % is greater than a user threshold. The user threshold may be an arbitrary threshold over which the web domain may be considered to be more likely to be malicious. As an example, the user threshold may be about 95%. If BadUsersByApp % is greater than the user threshold at decision block 1502, then method 1500 may proceed to step 1504, where web domain classification module 110 may adjust the web domain reputation score based on an increment (labeled UserInc in FIG. 15). As an example, the increment may be a value of about 20, although the instant disclosure is not limited to values of about 20. Rather, the increment at step 1504 may be any arbitrary increment indicating the increased likelihood that the web domain is malicious based on the decision at decision block 1502.

If BadUsersByApp % is not greater than the user threshold at decision block 1502, or after the completion of step 1504, method 1500 may then proceed to decision block 1506, where web domain classification module 110 may determine whether BadUsersByDomains % is greater than the user threshold. The user threshold may be the same or different than the user threshold at decision block 1502. If BadUsersByDomains % is greater than the user threshold at decision block 1506, then method 1500 may proceed to step 1508, where web domain classification module 110 may adjust the web domain reputation score by an increment. The increment at step 1508 may be the same increment (labeled "UserInc" in FIG. 15) as at step 1504 or different. The increment at step 1508 may be any arbitrary increment indicating the increased likelihood that the web domain is malicious based on the determination at decision block 1506. If BadUsersByDomains % is not greater than the user threshold at decision block 1506, or after method 1500 completes step 1508, method 1500 may end.

Although in the above example web domain classification module 110 modifies the web domain reputation score by an increment if the percentage of users with low reputations achieves a user threshold at decision blocks 1502 and 1506, the instant disclosure is not limited to adjusting the web reputation score in that binary manner. Rather, the instant disclosure also contemplates systems and methods that dynamically adjust the web domain reputation score in proportion to the percentage of users that have low reputations, so that greater proportions of bad users result in corresponding greater increments used at steps 1504 and 1508.

Returning to FIG. 7, at step 720 one or more of the systems described herein may adjust the web domain reputation score based on certain bad signature hits. For example, web domain classification module 110 may adjust the web domain reputation score based on a number, proportion, and/or percentage of hits to the web domain from intrusion prevention signatures, as discussed above regarding FIG. 5.

Figure 16:
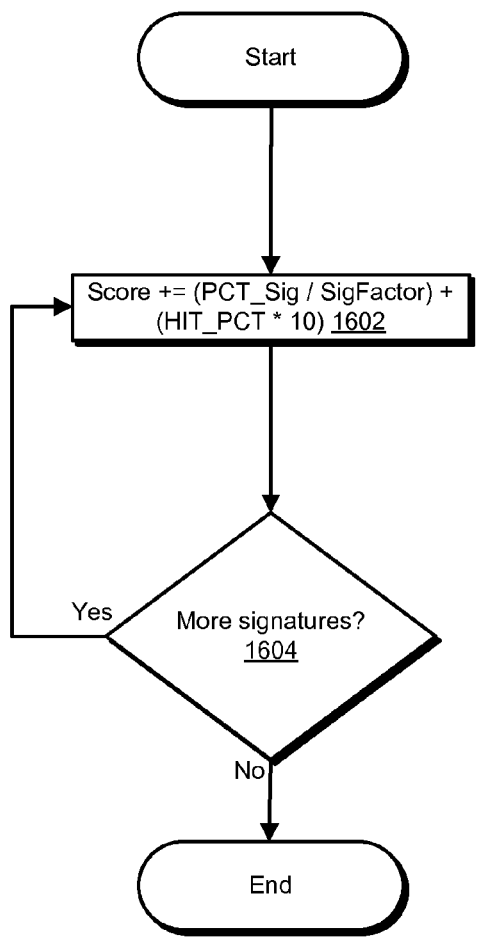
FIG. 16 is a flow diagram of an exemplary method for using client reputation data to classify web domains.

FIG. 16 illustrates a flow diagram of an exemplary computer-implemented method 1600 for adjusting the web domain reputation score based on certain (e.g., determined or predetermined) bad signature hits in accordance with step 720 in FIG. 7. The steps shown in FIG. 16 may be performed by any suitable computer-executable code and/or computing system. In some embodiments, the steps shown in FIG. 16 may be performed by one or more of the components of system 100 in FIG. 1 and/or system 200 in FIG. 2. For example, web domain classification module 110 may adjust the web domain reputation score based on a number, proportion, and/or percent of hits to the web domain from the signature hits specified above in the discussion of FIG. 5.

In FIG. 16, the term "PCT_SIG" may refer to a percentage of hits to the web domain from a particular intrusion prevention signature, such as the signatures listed above regarding FIG. 5. In addition, the term "HIT_PCT" may refer to the percentage of overall portable executable download hits from the web domain.

As illustrated in FIG. 16, at step 1602 web domain classification 110 may adjust the web domain reputation score by performing the following calculation. First, web domain classification module 110 may divide the PCT_SIG value for a first signature by a signature factor (labeled SigFactor in FIG. 16) for the first signature. To that resulting value, web domain classification module 110 may then add the value of HIT_PCT multiplied by a value of about 10. Web domain classification module 110 may then adjust (e.g., increase) the web domain reputation score based on the sum of those two values. That is, web domain classification module 110 may indicate that the web domain is more likely to be malicious in proportion to the percentage of hits to the domain from an intrusion prevention signature and in proportion to the percentage of overall portable executable download hits from the web domain.

From step 1602, method 1600 may then proceed to decision block 1604, where web domain classification module 110 may determine whether there are more signatures to be analyzed. If so, then method 1600 may return to step 1602 to adjust the web domain reputation score based on a next intrusion prevention signature. By executing steps 1602 and 1604 in a loop, web domain classification module 110 may cycle through all of the intrusion prevention signatures active in system 100 and/or another intrusion prevention system. If there are not more signatures to be analyzed at decision block 1604, then method 1600 may end.

The signature factor for a particular signature may vary depending on the nature of the threat that the signature identifies. Larger signature factors may decrease the contribution of the PCT_SIG value. Accordingly, larger signature values may be used for signatures that identify less malicious threats.

Although in the above example the value of HIT_PCT is multiplied by a value of about ten at each execution of step 1602, the instant disclosure is not limited to systems and methods that perform step 1602 in that manner. Rather, the value of HIT_PCT may be multiplied by a value different than ten or otherwise modified (or not modified) depending on the intrusion prevention signature being analyzed. The instant disclosure contemplates systems and methods that adjust the web domain reputation score in any manner based on a number, proportion, and/or percent of hits from intrusion system signatures to thereby indicate that the web domain is more likely to be malicious.

Although in the above example the web domain reputation score may be adjusted based on both a number, proportion, and/or percentage of hits to the web domain from a particular intrusion prevention signature and a number, proportion, and/or percentage of overall portable executable download hits from the web domain, web domain classification module 110 may adjust the web domain reputation score based on only one of those values (e.g., based on only one of PCT_Sig and HIT_PCT). Further, web domain classification module 110 may adjust the web domain reputation score based on both of those values in a manner different than that shown in FIG. 16 (e.g., by multiplying the two values instead of adding them together).

Returning to FIG. 7, at steps 722, 724, and 726 one or more of the systems described herein may adjust the web domain reputation score based on inputs that indicate that a web domain may be non-malicious. For example, web domain classification module 110 may adjust the web domain reputation score based on the web domain's ALEXA ranking (step 722), based on administrator input (step 724), and/or based on the web domain's MR. CLEAN reputation (step 726).

Figure 17:
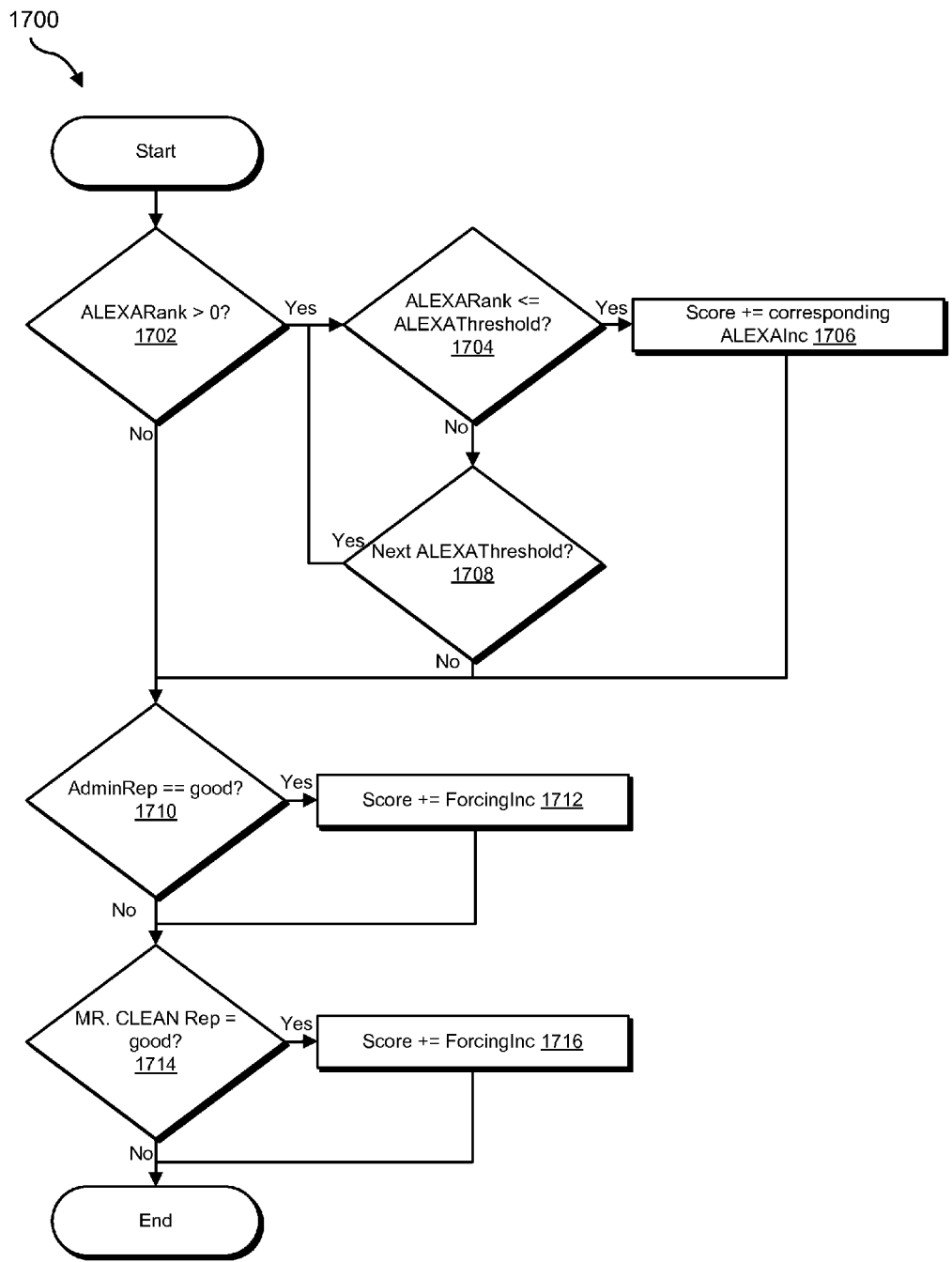
FIG. 17 is a flow diagram of an exemplary method for using client reputation data to classify web domains.

FIG. 17 illustrates a flow diagram of an exemplary computer-implemented method 1700 for adjusting the web domain reputation score based on the sources indicated at step 722, 724, and 726 of FIG. 7. The steps shown in FIG. 17 may be performed by any suitable computer-executable code and/or computing system. In some embodiments, the steps shown in FIG. 17 may be performed by one or more of the components of system 100 in FIG. 1 and/or system 200 in FIG. 2.

As illustrated in FIG. 17, at decision block 1702 web domain classification module 110 may determine weather the ALEXA ranking (labeled ALEXARank in FIG. 17) for the web domain is greater than zero. If so, then method 1700 may proceed to decision block 1704, where web domain classification module 110 may determine whether the ALEXARank for the web domain is less than or equal to a first ALEXA threshold. The first ALEXA threshold may have a magnitude sufficiently large so that if the web domain ALEXARank is less than or equal to the first ALEXAThreshold, web domain classification module 110 may then infer that the web domain is not malicious. From decision block 1704, method 1700 may then proceed to step 1706, where web domain classification module 110 may adjust the web domain reputation score based on a corresponding ALEXA increment (labeled ALEXAInc in FIG. 17). For example, if the first ALEXA threshold is sufficiently low as to indicate that a web domain having an ALEXA rank less than or equal to the first ALEXA threshold is not malicious, then the corresponding ALEXA increment for that threshold may have a magnitude large enough to overwhelm any other weights or contributions indicating that the web domain might be malicious. As an example, the first ALEXA threshold may be about 1000 and the first ALEXA increment may be about −200. These examples are merely exemplary, however, and any arbitrary value may be used for the magnitude of the ALEXA increment to thereby indicate that the web domain is less likely to malicious.

If the ALEXARank is not greater than the ALEXAThreshold at decision block 1704, then method 1700 may proceed to decision block 1708, where web domain classification module 110 may determine whether there is a next ALEXA threshold. If so, method 1700 may then return to decision block 1704 using the next ALEXA threshold. For example, the magnitude of the next ALEXA threshold may be larger than the magnitude of the first ALEXA threshold. Accordingly, even if the ALEXARank for the web domain is less than or equal to the second ALEXA threshold, web domain classification module 110 may infer that the web domain is less likely to be malicious without concluding that the web domain is not malicious. Thus, in that case, web domain classification module 110 may not overwhelm the adjustment of the web domain reputation score away from the maliciousness threshold. As an example, a second ALEXA threshold may be a value of about 2,000 and a second ALEXA increment may have a value of about −30. As noted above, though, the instant disclosure is not limited to systems and methods that use ALEXARanks of about 2,000 and increments of about −30. Rather, the instant disclosure contemplates systems and methods that may use increments of any arbitrary magnitude at step 1706 to thereby indicate that the web domain is less likely to be malicious. Additionally, ALEXA thresholds may be associated with corresponding ALEXA increments of proportional values, so that lower ALEXARanks are associated with more positive (e.g., more malicious) domain reputation scores, but the ALEXA thresholds and ALEXA increments may not be proportional in that manner.

If the decision is that there is not another ALEXA threshold at decision block 1708, or after the completion of step 1706, method 1700 may then proceed to decision block 1710, where web domain classification module 110 may determine whether an administrator has indicated that the web domain has a good reputation. If so, then method 1700 may proceed to step 1712, where the web domain reputation score may be adjusted to indicate that the web domain is not malicious. For example, the web domain reputation score may be adjusted by an increment of sufficiently large magnitude to overwhelm any other contributions indicating that the web domain may be malicious, as discussed above regarding the first ALEXA increment. As shown in FIG. 17, the increment may be called a "ForcingInc." As an example, the increment may be a value of about −200. However, the instant disclosure is not limited to values of about −200 and the increment may instead be any value of sufficient size so as to guarantee that the web domain reputation score does not achieve the maliciousness threshold (e.g., by overwhelming any other positive contributions to the score's calculation).

If the administrator has not assigned a good reputation to the web domain at decision block 1710, or after the completion of step 1712, method 1700 may proceed to decision block 1714, where web domain classification module 110 may determine whether MR. CLEAN indicates that the web domain has a good reputation. If so, then method 1700 may proceed to step 1716, where web domain classification module 110 may adjust the web domain reputation score to indicate that the web domain is not malicious, as in step 1712 discussed above. If MR. CLEAN has not assigned a good reputation to the web domain at decision block 1714, or after the completion of step 1716, method 1700 may then end.

The above discussion of FIGS. 7-17 generally describe further details of how web domain classification module 110 may classify web domains based on client reputation data (e.g., at steps 308 and/or 520 in FIGS. 3 and 5, respectively). The following description of FIGS. 18-21 describes further systems and/or methods that may supplement those shown in FIGS. 1-17. For example, the instant disclosure also contemplates systems and methods that take varying actions based on the classification or reputation of the web domain. Specifically, the following discussion of FIG. 18 shows how different security operations may be performed for corresponding web domain reputation scores.

Figure 18:
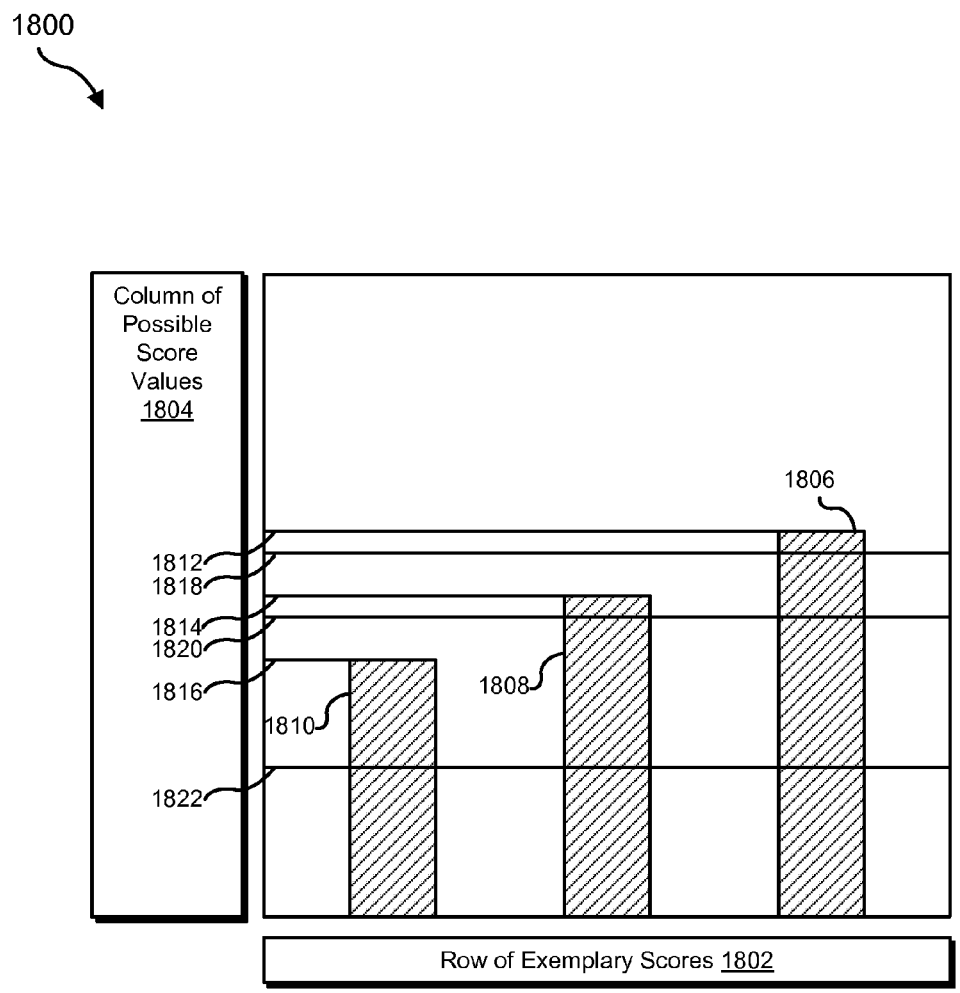
FIG. 18 is a chart diagram illustrating how different web domain reputation scores may be associated with different security operations.

FIG. 18 is a chart diagram illustrating how different web domain reputation scores may be associated with different security operations. In this example, row of exemplary scores 1802 may include different web domain reputation scores 1806, 1808, and 1810. Lines 1812, 1814, and 1816 may extend from the tops of those scores 1806, 1808, and 1810, thereby indicating the values of the scores along a column of possible score values 1804. Although not shown in FIG. 18, column of possible score values 1804 may include an axis of possible scores ranging from a minimum possible reputation score (e.g., −200) to a maximum possible reputation score (e.g., +200).

As shown in FIG. 18, the reputation scores 1806, 1808, and 1810 may achieve one or more maliciousness thresholds 1818, 1820, and 1822. A security implementation module within system 100 may perform a security operation whenever a web domain achieves a maliciousness threshold. The security operation may vary depending on the maliciousness threshold. For example, maliciousness threshold 1822 is relatively low and each of the web domain reputation scores 1806, 1808, and 1810 shown in FIG. 18 achieves that relatively low maliciousness threshold. Accordingly, the security implementation module in system 100 may perform a relatively minor security operation in response to the web domains achieving maliciousness threshold 1822. For example, the security operation performed in response to the achieving of the maliciousness threshold 1822 may be the adding of the web domain to a blacklist. In that case, system 100 may take no further action regarding the web domain other than adding the web domain to the blacklist. Similarly, the security implementation module in system 100 may raise the level of scrutiny for web domains that achieve a lower maliciousness threshold such as maliciousness threshold 1822. System 100 may silently monitor these web domains without performing any blocking actions.

FIG. 18 further shows a second maliciousness threshold 1820 that is higher than maliciousness threshold 1822. As an example, maliciousness threshold 1822 may be a value of about 80 and maliciousness threshold 1820 may be a value of about 100. As shown in FIG. 18, not all of the web domain reputation scores 1806, 1808, and 1810 achieve maliciousness threshold 1820. Rather, only web domain reputation scores 1806 and 1808 achieve that maliciousness threshold. Accordingly, the higher maliciousness threshold 1820 may indicate a correspondingly greater level of estimated maliciousness. In response, the security implementation model within system 100 may perform a correspondingly stronger, more significant, or more protective security operation when web domains achieve the higher maliciousness threshold 1820. For example, the security implementation module may block the downloading of portable executable files from the web domain when that web domain achieves a particular maliciousness threshold, such as maliciousness threshold 1820.

Lastly, FIG. 18 illustrates a third maliciousness threshold 1818 that is higher than the previously discussed maliciousness threshold 1822 and 1820. As shown in FIG. 18, only one of the web domain reputation scores (web domain reputation score 1806) achieves the highest maliciousness threshold 1818. As an example, maliciousness threshold may be a value of about 120. Because maliciousness threshold 1818 indicates an even greater level of maliciousness than the previous maliciousness thresholds 1820 and 1822, the security implementation module in system 100 may implement an even stronger, more significant, or more protective security operation in response to the achieving of maliciousness threshold 1818. For example, the security module may block all access to web domains having web domain reputation scores that achieve a maliciousness threshold, such as maliciousness threshold 1818.

The exemplary systems and methods disclosed herein are not limited to the security operations discussed above. Rather, the instant disclosure contemplates systems and methods that determine which of a plurality of any security operations to implement based on which maliciousness thresholds a web domain reputation score achieves.

As noted above, FIGS. 18-21 show systems and methods that may supplement those shown in FIGS. 1-17. The above discussion regarding FIG. 18 describes how different security operations may be performed for different web domain reputation scores. In turn, the following discussion regarding FIGS. 19 and 20 explains how blacklists may be pruned based on independently verified whitelists.

Figure 19:
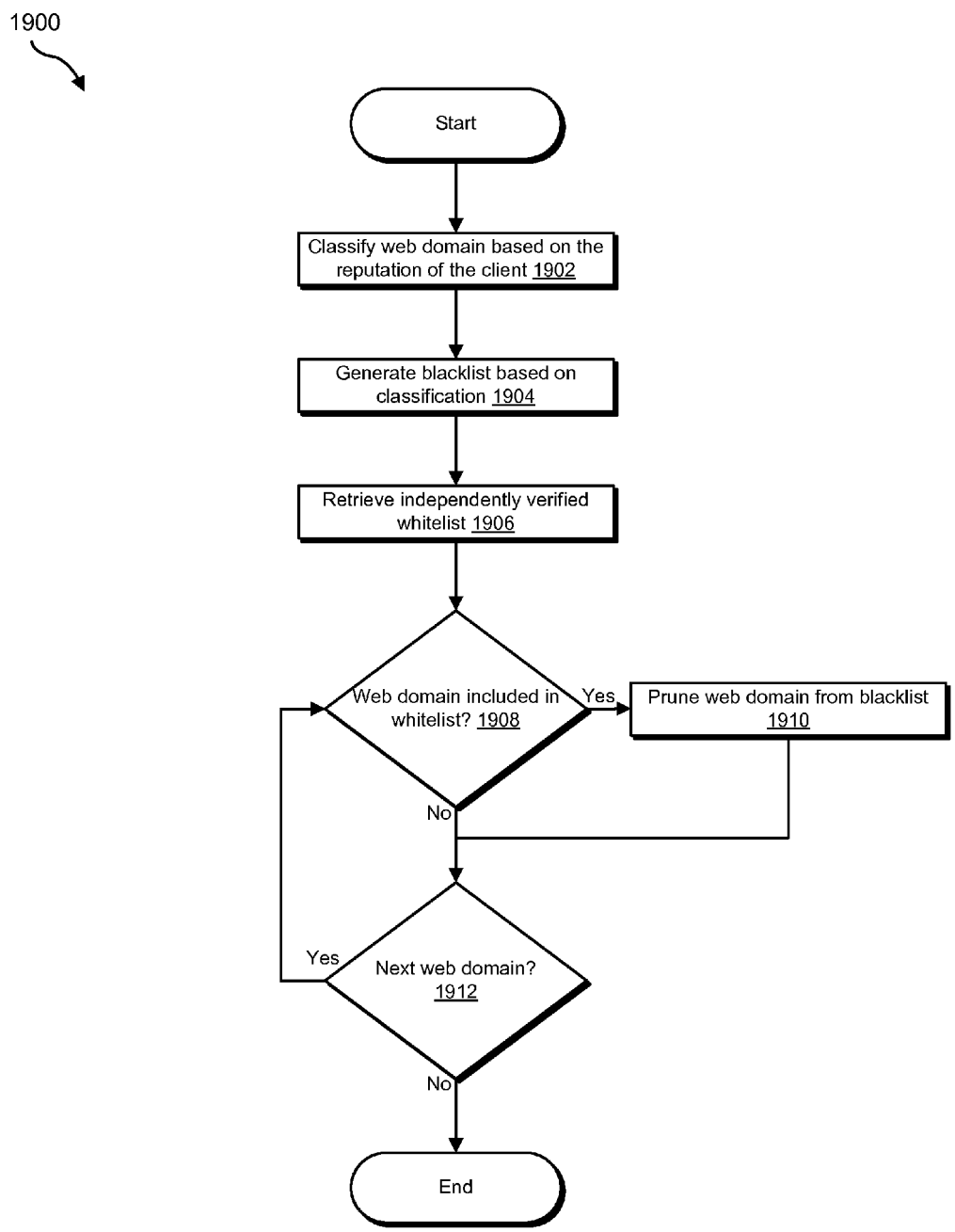
FIG. 19 is a flow diagram of an exemplary method for using client reputation data to classify web domains.

FIG. 19 shows a flow diagram of an exemplary computer-implemented method 1900 for pruning a blacklist generated by the web domain classification module 110 based on web domains included in a whitelist. The steps shown in FIG. 19 may be performed by any suitable computer-executable code and/or computing system. In some embodiments, the steps shown in FIG. 19 may be performed by one or more of the components of system 100 in FIG. 1 and/or system 200 in FIG. 2. For example, the steps within method 1900 may be performed by web domain classification module 110.

As shown in FIG. 19, at step 1902 web domain classification module 110 may classify the web domain based on the reputation of the client. From step 1902, method 1900 may proceed to step 1904, where web domain classification module 110 may generate a blacklist based on the classification performed at step 1902. The blacklist may be a list of web domains that are marked as malicious, untrustworthy, or otherwise suspect. System 100 or another intrusion prevention system may perform a further action based on the blacklist, such as silently monitoring web domains on the blacklist, blocking downloading of portable executable files from web domains on the blacklist, or blocking all access to web domains on the blacklist, for example. In some examples, steps 1902 and/or 1904 of FIG. 19 may largely correspond to step 308 of FIG. 3.

From step 1904, method 1900 may proceed to step 1906, where web domain classification module 110 may retrieve an independently verified whitelist. Although the whitelist shown in FIG. 19 is independently verified, the instant disclosure also contemplates the use of whitelists at step 1906 that are not independently verified. An independently verified whitelist may be a whitelist generated by an independent third party service using systems and methods that are alternative, supplemental, and/or partially redundant to those used to generate the blacklist. The whitelist may be a list of web domains that are known or suspected to be trustworthy or non-malicious.

From step 1906, method 1900 may proceed to decision block 1908, where web domain classification module 110 may determine whether a first web domain included in the blacklist generated at step 1904 is also included within the whitelist retrieved at step 1906. If so, web domain classification module 110 may infer that the previous classification of the web domain as malicious and inclusion of the web domain within the blacklist was an error. Accordingly, method 1900 may proceed to step 1910, where web domain classification module 110 may prune the web domain from the blacklist based on its inclusion within the whitelist retrieved at step 1906.

If the web domain included in the blacklist is not also included within the whitelist at decision block 1908, or after the completion of step 1910, method 1900 may then proceed to decision block 1912, where web domain classification module 110 may determine whether there is a next web domain to be analyzed at decision block 1908. If so, then method 1900 may return to decision block 1908 to determine whether the next web domain is included within the whitelist. By performing steps 1908, 1910, and 1912 of method 1900, web domain classification module 110 may cycle through all (or some) of the web domains included within the blacklist. Web domain classification module 110 may thereby prune all (or at least a portion) of the web domains included within the blacklist that the whitelist indicates are actually trustworthy or not malicious. If, however, there is no additional web domain at decision block 1912, then there are no more web domains in the blacklist to be analyzed, and method 1900 may end.

Although in the above example web domain classification module 110 may cycle through each of the web domains in the blacklist and then compare each web domain to the web domains in the whitelist, the instant disclosure also contemplates systems and methods that cycle through each of the web domains included within the whitelist and compare each of those web domains to the web domains included within the blacklist. Further, and as with all of the methods disclosed herein, one or more of the steps in method 1900 may be omitted or performed separately. For example, step 1906 may be performed before step 1902 or 1904.

Figure 20:
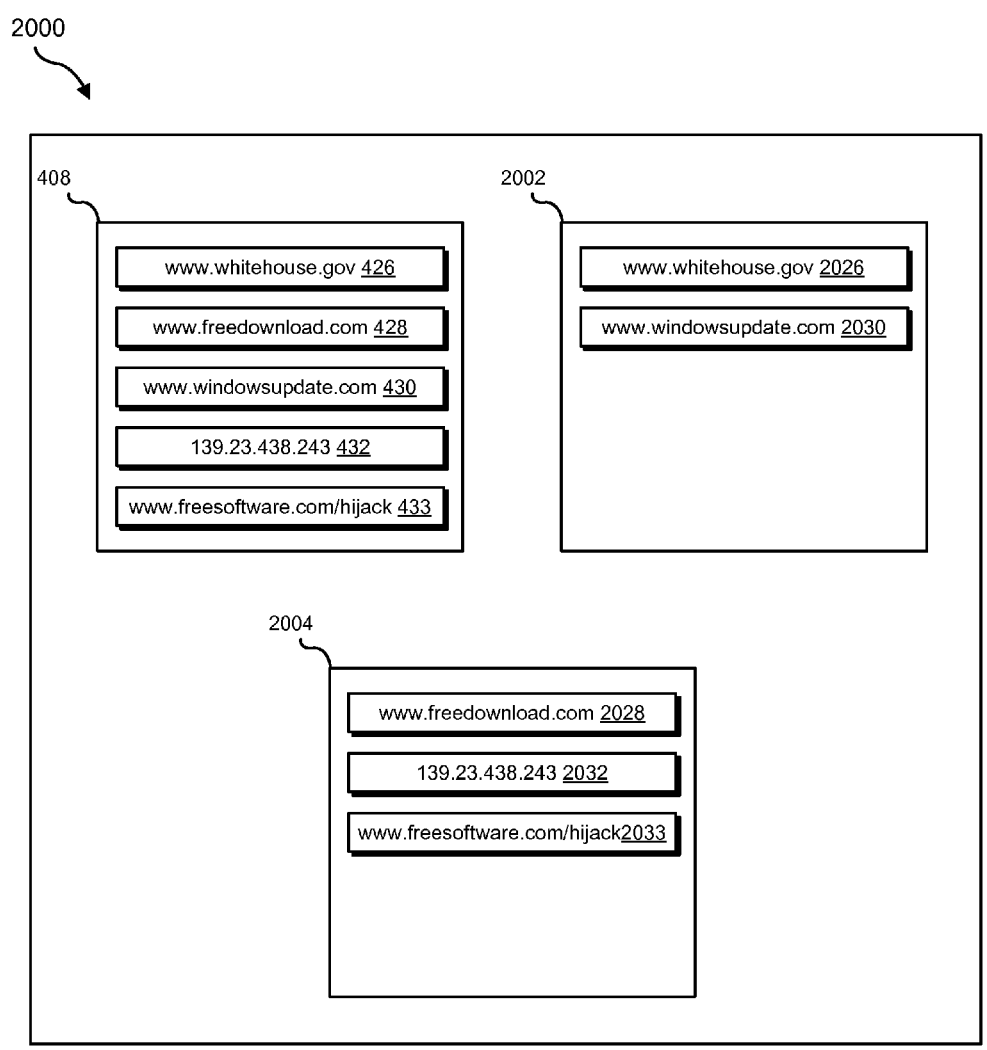
FIG. 20 illustrates exemplary lists of web domains.

FIG. 20 is graphical example of how method 1900 may be performed. FIG. 20 reproduces web domains 408 from FIG. 4. In the example of FIG. 20, each of web domains 408 may have been classified as malicious and included within a blacklist by the web domain classification module 110. In that case, web domain classification module 110 may retrieve an independently verified whitelist, in accordance with step 1906 in method 1900, such as independently verified whitelist 2002. As shown in FIG. 20, whitelist 2002 indicates that web domains 2026 and 2030 (corresponding to web domains 426 and 430 in web domains 408) are actually trustworthy and not malicious. Accordingly, web domain classification module 110 may prune the web domains in whitelist 2002 from web domains 408, in accordance with step 1910 of method 1900, to create an updated blacklist 2004. As shown in FIG. 20, updated blacklist 2004 includes each of the web domains 408 that are not included in whitelist 2002 (specifically, web domains 2028, 2032, and 2033) and no longer includes the web domains that are included in whitelist 2002 (specifically web domains 2026 and 2030).

As noted above, FIGS. 18-21 show systems and methods that may supplement those shown in FIGS. 1-17. The previous example of FIGS. 19 and 20 show how blacklists may be pruned based on independently verified whitelists. As a last example of supplementary systems and methods, the discussion of FIG. 21 below explains how systems and methods may automatically (or manually) be calibrated to decrease false positives and/or false negatives.

Figure 21:
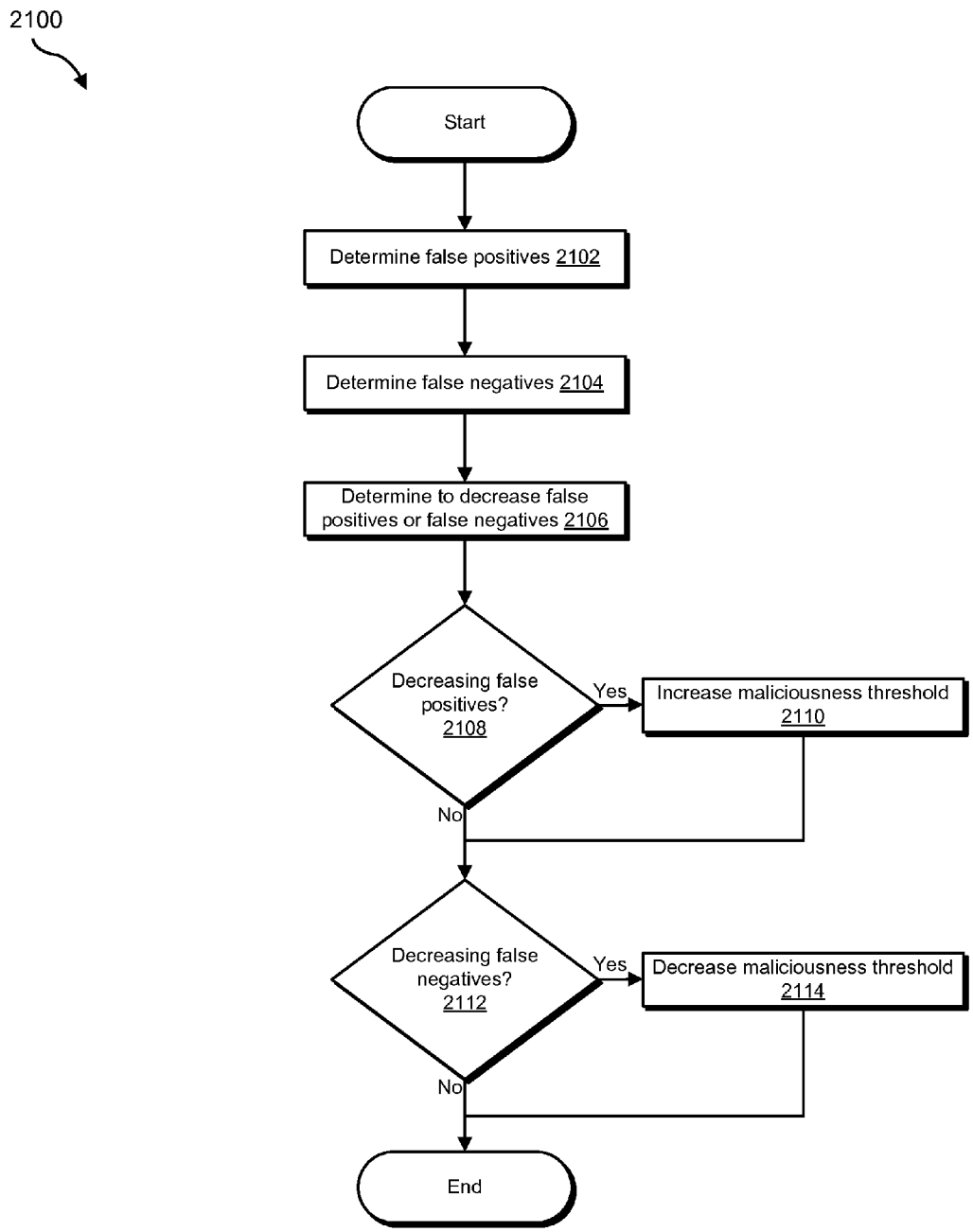
FIG. 21 is a flow diagram of an exemplary method for using client reputation data to classify web domains.

FIG. 21 shows a flow diagram of an exemplary computer-implemented method 2100 for calibrating maliciousness thresholds based on a number of false positives or false negatives. A false positive may be a determination that a web domain is malicious when, in fact, the web domain is actually trustworthy and not malicious. Similarly, a false negative may be a determination that a web domain is not malicious when, in fact, the web domain is malicious.

The steps shown in FIG. 21 may be performed by any suitable computer-executable code and/or computing system. In some embodiments, the steps shown in FIG. 21 may be performed by one or more of the components of system 100 in FIG. 1 and/or system 200 in FIG. 2. In general, one or more of the modules in system 100, including web domain classification module 110, may perform the steps in method 2100.

As illustrated in FIG. 21, at step 2102 web domain classification module 110 may determine a number, proportion, or rate of false positives. From step 2102, method 2100 may proceed to step 2104, where web domain classification module 110 may determine a number, proportion, or rate of false negatives.

The instant disclosure contemplates system and methods that determine false positives and false negatives in any order, and not necessarily the order shown in FIG. 21. Further, the instant disclosure contemplates systems and methods that determine false positives without determining false negatives, or determine false negatives without determining false positives. False positives and false negatives may be determined in any manner. For example, false positives and false negatives may be determined manually by a user or administrator independently verifying whether the web domain is malicious by accessing the web domain. Additionally, or alternatively, web domain classification module 110 may consult domain reputation sources, such as domain reputation sources 456-464 in FIG. 4, or otherwise retrieve an independently verified whitelist or blacklist, as discussed above regarding step 1906 of FIG. 19, to evaluate the accuracy of the classifications previously made by web domain classification module 110.

From step 2104, method 2100 may proceed to step 2106, where web domain classification module 110 may determine whether to decrease false positives and/or to decrease false negatives. Web domain classification module 110 may determine to decrease only one of the false positives and false negatives if decreasing one of them will result in necessarily increasing the other. Otherwise, web domain classification module 110 may determine to decrease both false positives and false negatives (or neither).

From step 2106, method 2100 may proceed to decision block 2108, where web domain classification module 110 may check whether a determination was made to decrease false positives. If so, then method 2100 may proceed to step 2110, where web domain classification module 110 may increase the maliciousness threshold. By increasing the maliciousness threshold, web domain classification module 110 may ensure that fewer web domains achieve the maliciousness threshold, and therefore that fewer false positives will obtain.

If false positives are not to be decreased at decision block 2108, or after completion of step 2110, method 2100 may proceed to decision block 2112, where web domain classification module 110 may check whether a determination was made to decrease false negatives. If so, method 2100 may then proceed to step 2114, where web domain classification module 110 may decrease the maliciousness threshold. By decreasing the maliciousness threshold, web domain classification module 110 may ensure that a larger number of web domains achieve the maliciousness threshold, thereby decreasing false negatives. If false negatives are not to be decreased at decision block 2112, or after the completion of step 2114, method 2100 may then end.

Although in the above example web domain classification module 110 decreases false positives and false negatives by increasing or decreasing the maliciousness thresholds at steps 2110 and/or 2114, the instant disclosure is not limited to decreasing false positives and false negatives in those particular manners. Rather, the instant disclosure contemplates decreasing false negatives and false positives in any manner in response to a determination to decrease false positives and/or false negatives. For example, instead of adjusting the maliciousness threshold at steps 2110 and/or 2114, web domain classification module 110 may additionally or alternatively adjust any of the above-mentioned factors included in the calculation of the web domain reputation score, including the SHASTA factors of FIG. 8, the index thresholds, index factors and size thresholds of FIG. 9, the formulas, coefficients, and/or increments in FIGS. 10-15, the SigFactors of FIG. 16 and/or the ALEXA thresholds, ALEXA increments, and forcing increments in FIG. 17, so that a larger or smaller number of web domains will be classified as malicious or non-malicious and/or so that fewer false positives and/or false negatives will obtain. Further, as with all of the methods disclosed herein, one or more of the steps in method 2100 may be omitted or performed separately. For example, false positives and false negatives may be handled independently in any order.

As explained above, by classifying web domains based on reputation information for one or more clients, the systems and methods disclosed herein may improve the accuracy of such a classification. In particular, the systems and methods described herein may more accurately determine whether a particular web domain is malicious (or the degree to which it is malicious) based on reputation information for one or more clients.

Figure 22:
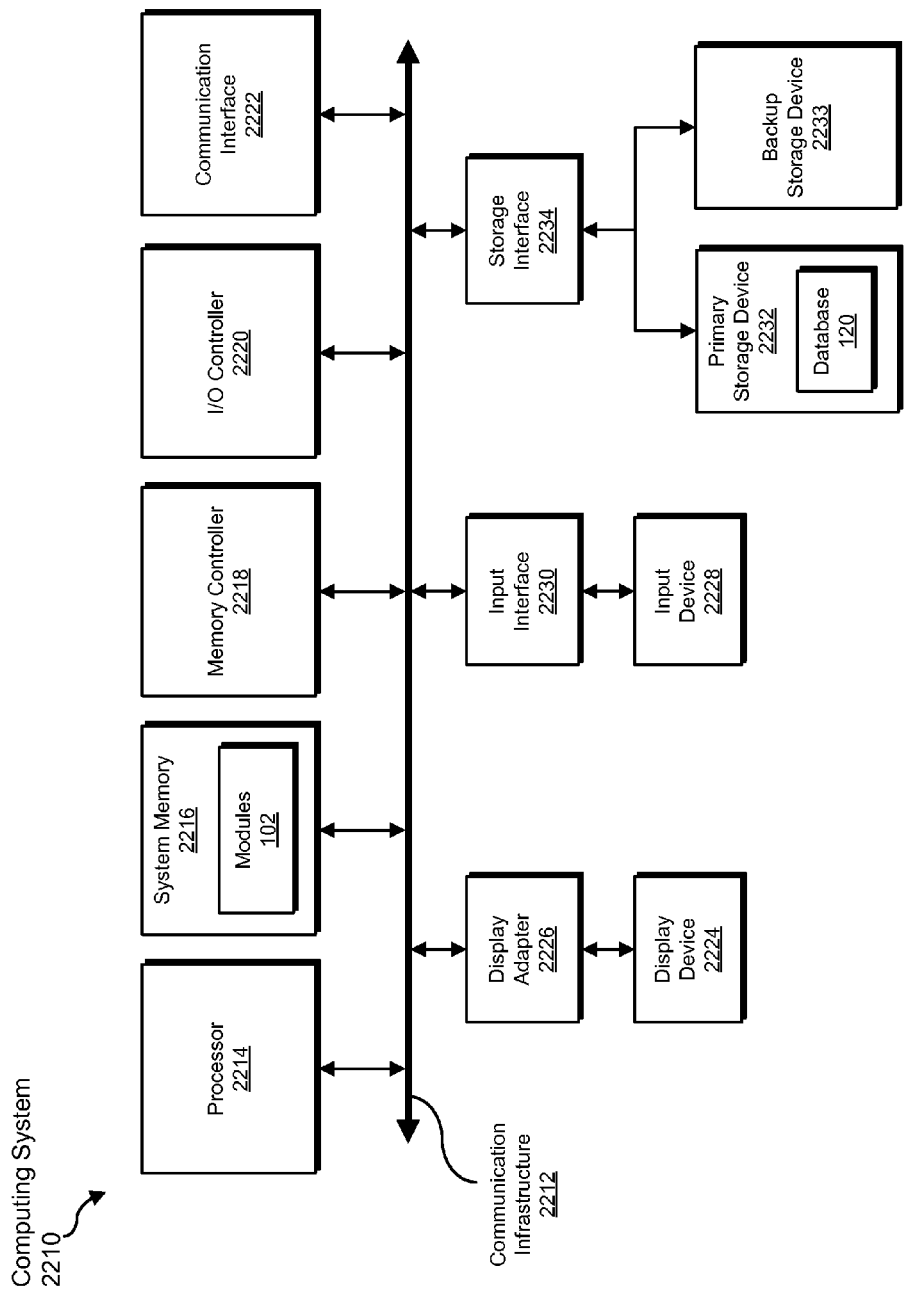
FIG. 22 is a block diagram of an exemplary computing system capable of implementing one or more of the embodiments described and/or illustrated herein.

FIG. 22 is a block diagram of an exemplary computing system 2210 capable of implementing one or more of the embodiments described and/or illustrated herein. Computing system 2210 broadly represents any single or multi-processor computing device or system capable of executing computer-readable instructions. Examples of computing system 2210 include, without limitation, workstations, laptops, client-side terminals, servers, distributed computing systems, handheld devices, or any other computing system or device. In its most basic configuration, computing system 2210 may include at least one processor 2214 and a system memory 2216.

Processor 2214 generally represents any type or form of processing unit capable of processing data or interpreting and executing instructions. In certain embodiments, processor 2214 may receive instructions from a software application or module. These instructions may cause processor 2214 to perform the functions of one or more of the exemplary embodiments described and/or illustrated herein. For example, processor 2214 may perform and/or be a means for performing, either alone or in combination with other elements, one or more of the identifying, classifying, receiving, ignoring, determining, performing, adding, blocking, updating, and/or making steps described herein. Processor 2214 may also perform and/or be a means for performing any other steps, methods, or processes described and/or illustrated herein.

System memory 2216 generally represents any type or form of volatile or non-volatile storage device or medium capable of storing data and/or other computer-readable instructions. Examples of system memory 2216 include, without limitation, random access memory (RAM), read only memory (ROM), flash memory, or any other suitable memory device. Although not required, in certain embodiments computing system 2210 may include both a volatile memory unit (such as, for example, system memory 2216) and a non-volatile storage device (such as, for example, primary storage device 2232, as described in detail below). In one example, one or more of modules 102 from FIG. 1 may be loaded into system memory 2216.

In certain embodiments, exemplary computing system 2210 may also include one or more components or elements in addition to processor 2214 and system memory 2216. For example, as illustrated in FIG. 22, computing system 2210 may include a memory controller 2218, an input/output (I/O) controller 2220, and a communication interface 2222, each of which may be interconnected via a communication infrastructure 2212. Communication infrastructure 2212 generally represents any type or form of infrastructure capable of facilitating communication between one or more components of a computing device. Examples of communication infrastructure 2212 include, without limitation, a communication bus (such as an ISA, PCI, PCIe, or similar bus) and a network.

Memory controller 2218 generally represents any type or form of device capable of handling memory or data or controlling communication between one or more components of computing system 2210. For example, in certain embodiments memory controller 2218 may control communication between processor 2214, system memory 2216, and I/O controller 2220 via communication infrastructure 2212. In certain embodiments, memory controller 2218 may perform and/or be a means for performing, either alone or in combination with other elements, one or more of the steps or features described and/or illustrated herein, such as identifying, classifying, receiving, ignoring, determining, performing, adding, blocking, updating, and/or making.

I/O controller 2220 generally represents any type or form of module capable of coordinating and/or controlling the input and output functions of a computing device. For example, in certain embodiments I/O controller 2220 may control or facilitate transfer of data between one or more elements of computing system 2210, such as processor 2214, system memory 2216, communication interface 2222, display adapter 2226, input interface 2230, and storage interface 2234. I/O controller 2220 may be used, for example, to perform and/or be a means for performing, either alone or in combination with other elements, one or more of the identifying, classifying, receiving, ignoring, determining, performing, adding, blocking, updating, and/or making steps described herein. I/O controller 2220 may also be used to perform and/or be a means for performing other steps and features set forth in the instant disclosure.

Communication interface 2222 broadly represents any type or form of communication device or adapter capable of facilitating communication between exemplary computing system 2210 and one or more additional devices. For example, in certain embodiments communication interface 2222 may facilitate communication between computing system 2210 and a private or public network including additional computing systems. Examples of communication interface 2222 include, without limitation, a wired network interface (such as a network interface card), a wireless network interface (such as a wireless network interface card), a modem, and any other suitable interface. In at least one embodiment, communication interface 2222 may provide a direct connection to a remote server via a direct link to a network, such as the Internet. Communication interface 2222 may also indirectly provide such a connection through, for example, a local area network (such as an Ethernet network), a personal area network, a telephone or cable network, a cellular telephone connection, a satellite data connection, or any other suitable connection.

In certain embodiments, communication interface 2222 may also represent a host adapter configured to facilitate communication between computing system 2210 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 2222 may also allow computing system 2210 to engage in distributed or remote computing. For example, communication interface 2222 may receive instructions from a remote device or send instructions to a remote device for execution. In certain embodiments, communication interface 2222 may perform and/or be a means for performing, either alone or in combination with other elements, one or more of the identifying, classifying, receiving, ignoring, determining, performing, adding, blocking, updating, and/or making steps disclosed herein. Communication interface 2222 may also be used to perform and/or be a means for performing other steps and features set forth in the instant disclosure.

As illustrated in FIG. 22, computing system 2210 may also include at least one display device 2224 coupled to communication infrastructure 2212 via a display adapter 2226. Display device 2224 generally represents any type or form of device capable of visually displaying information forwarded by display adapter 2226. Similarly, display adapter 2226 generally represents any type or form of device configured to forward graphics, text, and other data from communication infrastructure 2212 (or from a frame buffer, as known in the art) for display on display device 2224.

As illustrated in FIG. 22, exemplary computing system 2210 may also include at least one input device 2228 coupled to communication infrastructure 2212 via an input interface 2230. Input device 2228 generally represents any type or form of input device capable of providing input, either computer or human generated, to exemplary computing system 2210. Examples of input device 2228 include, without limitation, a keyboard, a pointing device, a speech recognition device, or any other input device. In at least one embodiment, input device 2228 may perform and/or be a means for performing, either alone or in combination with other elements, one or more of the identifying, classifying, receiving, ignoring, determining, performing, adding, blocking, updating, and/or making steps disclosed herein. Input device 2228 may also be used to perform and/or be a means for performing other steps and features set forth in the instant disclosure.

As illustrated in FIG. 22, exemplary computing system 2210 may also include a primary storage device 2232 and a backup storage device 2233 coupled to communication infrastructure 2212 via a storage interface 2234. Storage devices 2232 and 2233 generally represent any type or form of storage device or medium capable of storing data and/or other computer-readable instructions. For example, storage devices 2232 and 2233 may be a magnetic disk drive (e.g., a so-called hard drive), a floppy disk drive, a magnetic tape drive, an optical disk drive, a flash drive, or the like. Storage interface 2234 generally represents any type or form of interface or device for transferring data between storage devices 2232 and 2233 and other components of computing system 2210. In one example, database 120 from FIG. 1 may be stored in primary storage device 2232.

In certain embodiments, storage devices 2232 and 2233 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 2232 and 2233 may also include other similar structures or devices for allowing computer software, data, or other computer-readable instructions to be loaded into computing system 2210. For example, storage devices 2232 and 2233 may be configured to read and write software, data, or other computer-readable information. Storage devices 2232 and 2233 may also be a part of computing system 2210 or may be a separate device accessed through other interface systems.

In certain embodiments, storage devices 2232 and 2233 may be used, for example, to perform and/or be a means for performing, either alone or in combination with other elements, one or more of the identifying, classifying, receiving, ignoring, determining, performing, adding, blocking, updating, and/or making steps disclosed herein. Storage devices 2232 and 2233 may also be used to perform and/or be a means for performing other steps and features set forth in the instant disclosure.

Many other devices or subsystems may be connected to computing system 2210. Conversely, all of the components and devices illustrated in FIG. 22 need not be present to practice the embodiments described and/or illustrated herein. The devices and subsystems referenced above may also be interconnected in different ways from that shown in FIG. 22. Computing system 2210 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 2210. All or a portion of the computer program stored on the computer-readable medium may then be stored in system memory 2216 and/or various portions of storage devices 2232 and 2233. When executed by processor 2214, a computer program loaded into computing system 2210 may cause processor 2214 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 2210 may be configured as an application specific integrated circuit (ASIC) adapted to implement one or more of the exemplary embodiments disclosed herein.

Figure 23:
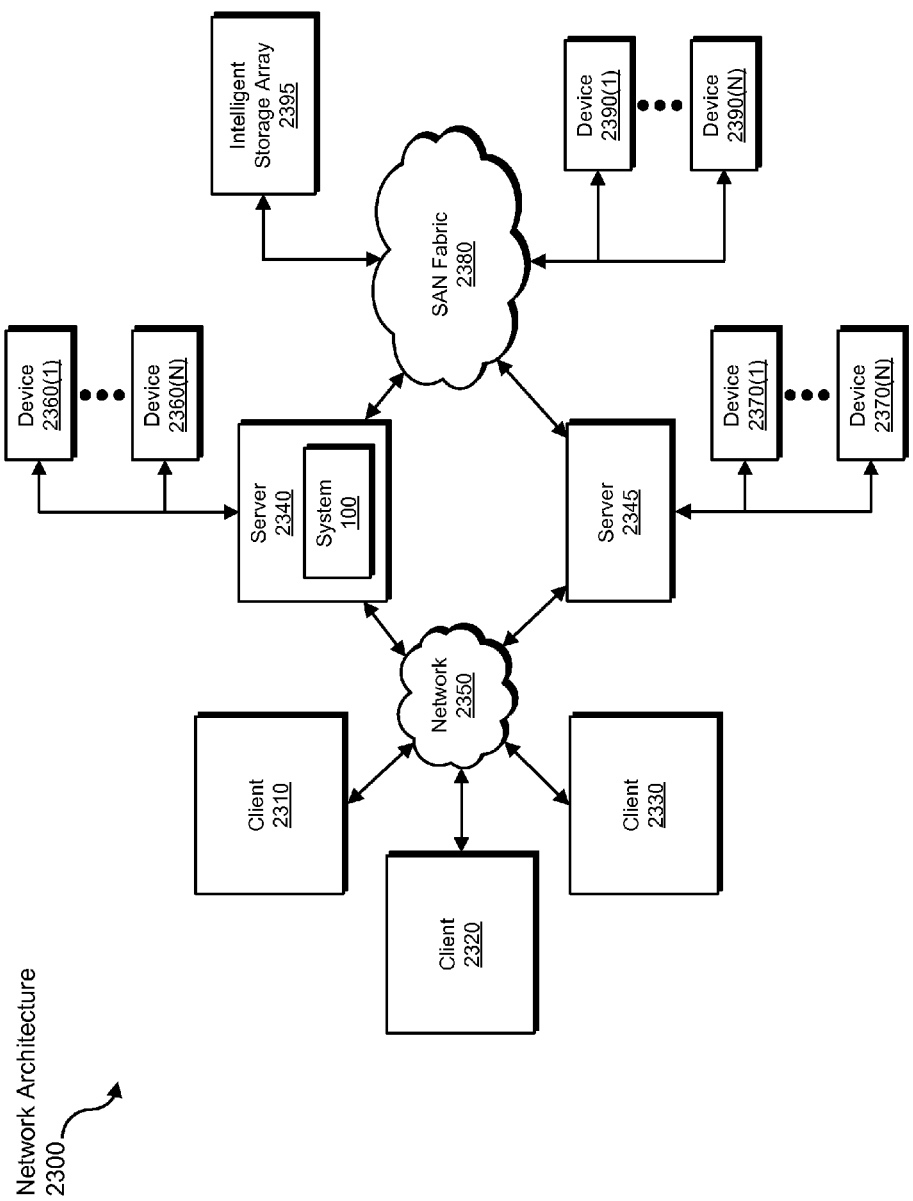
FIG. 23 is a block diagram of an exemplary computing network capable of implementing one or more of the embodiments described and/or illustrated herein.

FIG. 23 is a block diagram of an exemplary network architecture 2300 in which client systems 2310, 2320, and 2330 and servers 2340 and 2345 may be coupled to a network 2350. Client systems 2310, 2320, and 2330 generally represent any type or form of computing device or system, such as exemplary computing system 2210 in FIG. 22. In one example, server 2340 may include system 100 from FIG. 1.

Similarly, servers 2340 and 2345 generally represent computing devices or systems, such as application servers or database servers, configured to provide various database services and/or run certain software applications. Network 2350 generally represents any telecommunication or computer network including, for example, an intranet, a wide area network (WAN), a local area network (LAN), a personal area network (PAN), or the Internet.

As illustrated in FIG. 23, one or more storage devices 2360(1)-(N) may be directly attached to server 2340. Similarly, one or more storage devices 2370(1)-(N) may be directly attached to server 2345. Storage devices 2360(1)-(N) and storage devices 2370(1)-(N) generally represent any type or form of storage device or medium capable of storing data and/or other computer-readable instructions. In certain embodiments, storage devices 2360(1)-(N) and storage devices 2370(1)-(N) may represent network-attached storage (NAS) devices configured to communicate with servers 2340 and 2345 using various protocols, such as NFS, SMB, or CIFS.

Servers 2340 and 2345 may also be connected to a storage area network (SAN) fabric 2380. SAN fabric 2380 generally represents any type or form of computer network or architecture capable of facilitating communication between a plurality of storage devices. SAN fabric 2380 may facilitate communication between servers 2340 and 2345 and a plurality of storage devices 2390(1)-(N) and/or an intelligent storage array 2395. SAN fabric 2380 may also facilitate, via network 2350 and servers 2340 and 2345, communication between client systems 2310, 2320, and 2330 and storage devices 2390(1)-(N) and/or intelligent storage array 2395 in such a manner that devices 2390(1)-(N) and array 2395 appear as locally attached devices to client systems 2310, 2320, and 2330. As with storage devices 2360(1)-(N) and storage devices 2370(1)-(N), storage devices 2390(1)-(N) and intelligent storage array 2395 generally represent any type or form of storage device or medium capable of storing data and/or other computer-readable instructions.

In certain embodiments, and with reference to exemplary computing system 2210 of FIG. 22, a communication interface, such as communication interface 2222 in FIG. 22, may be used to provide connectivity between each client system 2310, 2320, and 2330 and network 2350. Client systems 2310, 2320, and 2330 may be able to access information on server 2340 or 2345 using, for example, a web browser or other client software. Such software may allow client systems 2310, 2320, and 2330 to access data hosted by server 2340, server 2345, storage devices 2360(1)-(N), storage devices 2370(1)-(N), storage devices 2390(1)-(N), or intelligent storage array 2395. Although FIG. 23 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 2340, server 2345, storage devices 2360(1)-(N), storage devices 2370(1)-(N), storage devices 2390(1)-(N), intelligent storage array 2395, or any combination thereof. All or a portion of one or more of the exemplary embodiments disclosed herein may also be encoded as a computer program, stored in server 2340, run by server 2345, and distributed to client systems 2310, 2320, and 2330 over network 2350. Accordingly, network architecture 2300 may perform and/or be a means for performing, either alone or in combination with other elements, one or more of the identifying, classifying, receiving, ignoring, determining, performing, adding, blocking, updating, and/or making steps disclosed herein. Network architecture 2300 may also be used to perform and/or be a means for performing other steps and features set forth in the instant disclosure.

As detailed above, computing system 2210 and/or one or more components of network architecture 2300 may perform and/or be a means for performing, either alone or in combination with other elements, one or more steps of an exemplary method for using client reputation data to classify web domains.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of modules 102 in FIG. 1 may implement a change to a web domain's reputation data to indicate that the web domain is malicious or not malicious based on the reputations of clients that have attempted to access the web domain.

The exemplary systems described and/or illustrated herein may be deployed in a variety of ways. In some examples, all or a portion of these exemplary systems may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for using client reputation data to classify web domains, the method comprising:
    identifying, at a server-side computing device that comprises at least one processor, a web domain;
    identifying, at the server-side computing device, a plurality of applications that previously attempted to access the web domain;
    identifying, at the server-side computing device, at least one client device that previously attempted to access the web domain at least in part by receiving information from the client device that indicates that an attempt by the client device to access the web domain triggered a security event;
    calculating, at the server-side computing device, a proportion of applications within the plurality of applications that have a reputation for being malicious;
    classifying, at the server-side computing device, the web domain based at least in part on the calculated proportion of applications, of the plurality of applications that previously attempted to access the web domain, that have the reputation for being malicious.

2. The method of claim 1, wherein
    the attempt by the client device to access the web domain comprises an attempt by a user of the client device to access the web domain.

3. The method of claim 1, wherein the information received from the client device identifies at least one of:
    the client device;
    the web domain.

4. The method of claim 1, wherein classifying the web domain comprises:
    identifying a threat category triggered by the client device's attempt to access the web domain;
    classifying the web domain based at least in part on the threat category triggered by the client device's attempt to access the web domain.

5. The method of claim 1, wherein classifying the web domain comprises ignoring at least some reputation information collected outside of a predetermined time window when classifying the web domain.

6. The method of claim 1, wherein classifying the web domain comprises:
    calculating a reputation score for the web domain based at least in part on the reputation of the client device that previously attempted to access the web domain;
    determining that the reputation score for the web domain achieves a maliciousness threshold.

7. The method of claim 6, further comprising, upon determining that the reputation score for the web domain achieves a maliciousness threshold, performing a security operation on the web domain.

8. The method of claim 7, wherein performing the security operation on the web domain comprises at least one of:
    adding the web domain to a blacklist;
    blocking downloading of files from the web domain.

9. The method of claim 8, further comprising:
    after calculating the reputation score, identifying a reputation of at least one additional client device that previously attempted to access the web domain;
    updating the reputation score for the web domain based at least in part on the reputation of the additional client device.

10. The method of claim 9, further comprising:
    making a second determination that the updated reputation score does not achieve the maliciousness threshold;
    updating the classification of the web domain by removing the web domain from the blacklist in response to determining that the updated reputation score does not achieve the maliciousness threshold.

11. The method of claim 1, wherein classifying the web domain comprises classifying the web domain based at least in part on at least one of:
    a third-party classification of the web domain;
    a previous classification of the web domain.

12. A system for using client reputation data to classify web domains, comprising:
    a web domain identification module programmed to identify, at a server-side computing device, a web domain;
    a client identification module programmed to:
        identify, at the server-side computing device, a plurality of applications that previously attempted to access the web domain;
        identify, at the server-side computing device, at least one client device that previously attempted to access the web domain at least in part by receiving information from the client device that indicates that an attempt by the client device to access the web domain triggered a security event;
    a client reputation identification module programmed to calculate, at the server-side computing device, a proportion of applications within the plurality of applications that have a reputation for being malicious;
    a web domain classification module programmed to classify, at the server-side computing device, the web domain based at least in part on the calculated proportion of applications, of the plurality of applications that previously attempted to access the web domain, that have the reputation for being malicious;
    at least one processor configured to execute at least one of the web domain identification module, the client identification module, the client reputation identification module, and the web domain classification module.

13. The system of claim 12, wherein
    the attempt by the client device to access the web domain comprises an attempt by a user of the client device to access the web domain.

14. The system of claim 12, wherein the information received from the client device identifies at least one of:
    the client device;
    the web domain.

15. The system of claim 12, wherein the web domain classification module classifies the web domain by:
    identifying a threat category triggered by the client device's attempt to access the web domain;
    classifying the web domain based at least in part on the threat category triggered by the client device's attempt to access the web domain.

16. The system of claim 12, wherein the web domain classification module classifies the web domain by ignoring at least some reputation information collected outside of a predetermined time window when classifying the web domain.

17. The system of claim 12, wherein the web domain classification module classifies the web domain by:
    calculating a reputation score for the web domain based at least in part on the reputation of the client device that previously attempted to access the web domain;
    determining that the reputation score for the web domain achieves a maliciousness threshold.

18. A non-transitory computer-readable-storage medium comprising one or more computer-executable instructions that, when executed by at least one processor of a computing device, cause the computing device to:
- identify, at a server-side computing device that comprises at least one processor, a web domain;
- identify, at the server-side computing device, a plurality of applications that previously attempted to access the web domain;
- identify, at the server-side computing device, at least one client device that previously attempted to access the web domain at least in part by receiving information from the client device that indicates that an attempt by the client device to access the web domain triggered a security event;
- calculate, at the server-side computing device, a proportion of applications within the plurality of applications that have a reputation for being malicious;
- classify, at the server-side computing device, the web domain based at least in part on the calculated proportion of applications, of the plurality of applications that previously attempted to access the web domain, that have the reputation for being malicious.

* * * * *